United States Patent
Suzuki et al.

(10) Patent No.: US 9,384,642 B2
(45) Date of Patent: Jul. 5, 2016

(54) IMAGE PROCESSING APPARATUS, IMAGE PROCESSING SYSTEM, AND FILTER SETTING METHOD

(71) Applicant: Sony Corporation, Tokyo (JP)

(72) Inventors: Masafumi Suzuki, Tokyo (JP); Kazuma Tsukuda, Kanagawa (JP); Shin Yanai, Tokyo (JP); Isao Ohara, Kanagawa (JP)

(73) Assignee: Sony Corporation (JP)

( * ) Notice: Subject to any disclaimer, the term of this patent is extended or adjusted under 35 U.S.C. 154(b) by 156 days.

(21) Appl. No.: 14/197,929

(22) Filed: Mar. 5, 2014

(65) Prior Publication Data

US 2014/0185877 A1 Jul. 3, 2014

Related U.S. Application Data

(63) Continuation of application No. 11/823,875, filed on Jun. 29, 2007, now Pat. No. 8,797,403.

(30) Foreign Application Priority Data

Jun. 30, 2006 (JP) ................................ P2006-182824

(51) Int. Cl.
*G06K 9/00* (2006.01)
*G08B 13/196* (2006.01)
(Continued)

(52) U.S. Cl.
CPC ...... *G08B 13/19608* (2013.01); *G06F 17/3079* (2013.01); *G06F 17/30817* (2013.01);
(Continued)

(58) Field of Classification Search
CPC .................................................... G06K 9/62
USPC ...................................................... 382/103
See application file for complete search history.

(56) References Cited

U.S. PATENT DOCUMENTS 6,628,835 B1  9/2003  Brill et al.
6,696,945 B1  2/2004  Venetianer et al.
(Continued)

FOREIGN PATENT DOCUMENTS

JP  11-177973 A  7/1999
JP  2001-167095 A  6/2001
(Continued)

OTHER PUBLICATIONS

European Search Report, Ep 07111243, dated Oct. 15, 2009.
(Continued)

*Primary Examiner* — Stephen R Koziol
*Assistant Examiner* — Delomia L Gilliard
(74) *Attorney, Agent, or Firm* — Lerner, David, Littenberg, Krumholz & Mentlik, LLP

(57) ABSTRACT

Disclosed herein is an image processing apparatus including an image data acquisition section, a metadata acquisition section, a display section, a filter setting section, and a combination setting section. The image data acquisition section is configured to acquire image data from a camera. The metadata acquisition section is configured to acquire, from the camera, metadata representing information concerning an object of surveillance. The display section is configured to display a setting screen usable for setting a plurality of filters. The filter setting section is configured to perform filter setting using the information of the metadata. The combination setting section is configured to set a combination of the plurality of filters. The filter setting section and the combination setting section are provided on the same setting screen.

7 Claims, 15 Drawing Sheets

(51) Int. Cl.
*G06F 17/30* (2006.01)
*G11B 27/11* (2006.01)
*G11B 27/32* (2006.01)

(52) U.S. Cl.
CPC .... *G06F17/30828* (2013.01); *G06F 17/30831* (2013.01); *G08B 13/1968* (2013.01); *G08B 13/19671* (2013.01); *G08B 13/19682* (2013.01); *G11B 27/11* (2013.01); *G11B 27/322* (2013.01)

(56) References Cited

U.S. PATENT DOCUMENTS

| | | | |
|---|---|---|---|
| 6,970,083 | B2 | 11/2005 | Venetianer et al. |
| 7,015,957 | B2 | 3/2006 | Romano et al. |
| 7,235,785 | B2 | 6/2007 | Hornback et al. |
| 7,327,390 | B2 | 2/2008 | Gallagher |
| 7,356,778 | B2 | 4/2008 | Hooper et al. |
| 7,421,089 | B2 | 9/2008 | Camara et al. |
| 7,424,175 | B2 | 9/2008 | Lipton et al. |
| 7,664,292 | B2 | 2/2010 | van den Bergen et al. |
| 7,852,384 | B2 | 12/2010 | DeLuca et al. |
| 7,868,912 | B2 | 1/2011 | Venetianer et al. |
| 7,924,323 | B2 | 4/2011 | Walker et al. |
| 7,952,638 | B2 | 5/2011 | Shinkai et al. |
| 2002/0062481 | A1 | 5/2002 | Slaney et al. |
| 2003/0040925 | A1 | 2/2003 | Gutta et al. |
| 2004/0075738 | A1 | 4/2004 | Burke et al. |
| 2005/0024495 | A1 | 2/2005 | Hamrelius et al. |
| 2005/0044100 | A1 | 2/2005 | Hooper et al. |
| 2005/0108748 | A1 | 5/2005 | Nishikawa et al. |
| 2005/0132414 | A1 | 6/2005 | Bentley et al. |
| 2005/0169367 | A1 | 8/2005 | Venetianer et al. |
| 2005/0205785 | A1 | 9/2005 | Hornback et al. |
| 2006/0044399 | A1 | 3/2006 | Fredlund et al. |
| 2006/0088202 | A1 | 4/2006 | Venkatachalam |
| 2006/0170769 | A1* | 8/2006 | Zhou ............... G06K 9/00362 348/143 |
| 2006/0170791 | A1 | 8/2006 | Porter et al. |
| 2007/0159541 | A1 | 7/2007 | Sparks et al. |
| 2007/0236567 | A1 | 10/2007 | Pillman et al. |
| 2007/0240154 | A1 | 10/2007 | Gerzymisch et al. |
| 2007/0263092 | A1 | 11/2007 | Fedorovskaya et al. |
| 2008/0192129 | A1* | 8/2008 | Walker ............... G11B 27/034 348/231.2 |

FOREIGN PATENT DOCUMENTS

| | | |
|---|---|---|
| JP | 2002-262282 A | 9/2002 |
| JP | 2003-274390 A | 9/2003 |
| JP | 2004-355453 A | 12/2004 |
| JP | 2006-139382 A | 6/2006 |
| JP | 2006-146378 A | 6/2006 |

OTHER PUBLICATIONS

Summons to attend oral proceedings pursuant to Rule 115 (1) EPC, from European Search Report Application No. 07-111243.7, dated Dec. 27, 2011.

* cited by examiner

F I G . 5
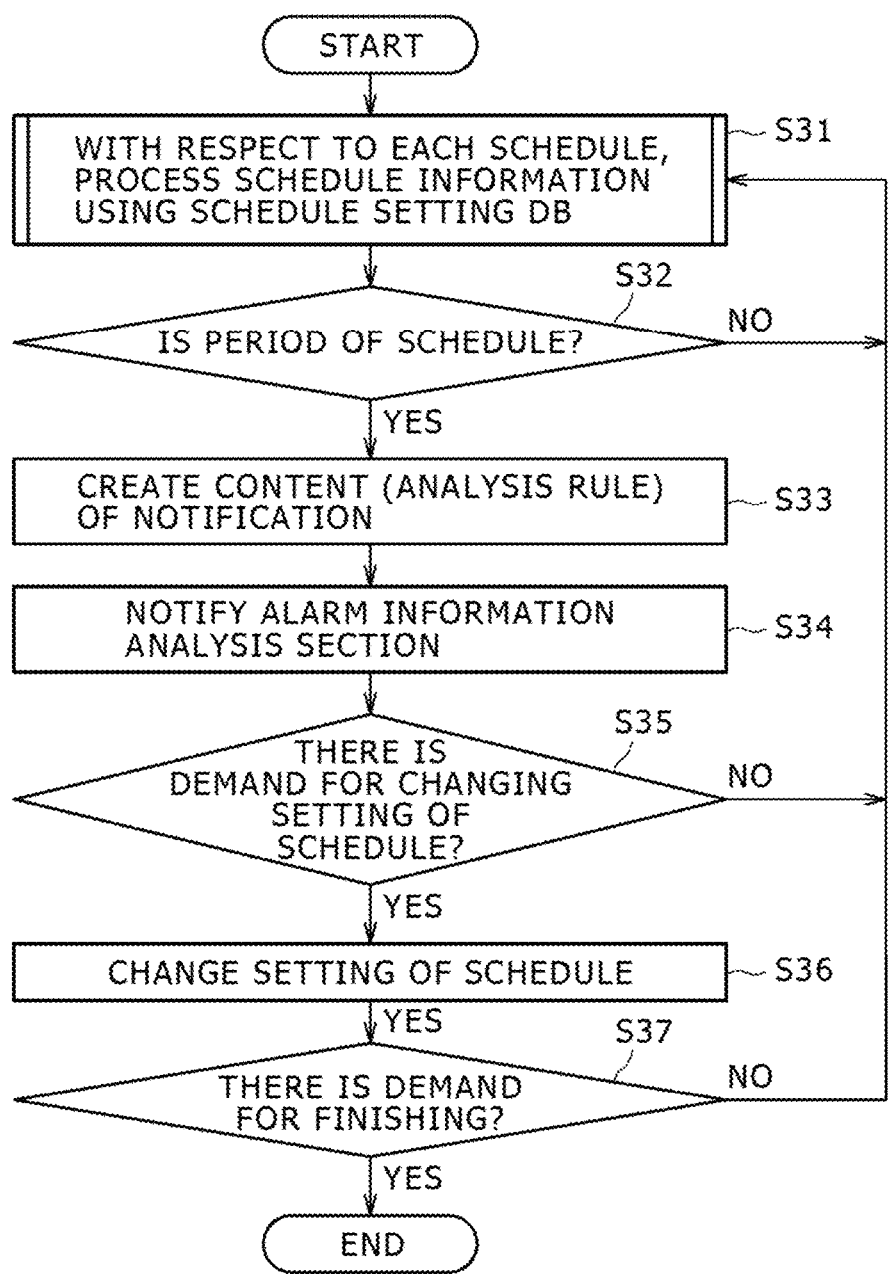

IMAGE PROCESSING APPARATUS, IMAGE PROCESSING SYSTEM, AND FILTER SETTING METHOD

CROSS REFERENCES TO RELATED APPLICATIONS

The present invention is a continuation of U.S. patent application Ser. No. 11/823,875, filed on Jun. 29, 2007 which claims priority from Japanese Patent Application JP 2006-182824, filed in the Japanese Patent Office on Jun. 30, 2006, all of which are incorporated herein by reference.

BACKGROUND OF THE INVENTION

1. Field of the Invention

The present invention relates to an image processing apparatus and system that acquire, from a surveillance camera, image data and data (i.e., metadata) related to the image data, subject the metadata to filtering, and output a result of surveillance based on a result of the filtering. The present invention also relates to a filter setting method employed in the image processing apparatus.

2. Description of the Related Art

There is a known surveillance system that includes a surveillance camera and a control device connected to each other via a network. In such a surveillance system, the surveillance camera transmits image data (i.e., data of an image photographed) to the control device via the network. The control device receives and records the image data, and analyzes the image data to detect occurrence of an abnormality and output an alarm. Thus, an operator is able to conduct surveillance while checking a surveillance image displayed on a monitor and the alarm outputted by the control device.

In recent years, surveillance cameras not only transmit the image data (i.e., the data of the image photographed) to the control device but also have a function of generating metadata (e.g., alarm information, temperature information, or information of the angle of view of the camera) related to the image data and transmitting the metadata to the control device. In a surveillance system using such a surveillance camera, the control device passes the metadata supplied from the surveillance camera through a metadata filter in which a specific condition for outputting the alarm is set, and outputs the alarm if the condition is satisfied. Examples of the condition set in the metadata filter include conditions for detecting, as an abnormality, intrusion of a suspicious substance into a particular place, a moving object passing over a particular boundary line, etc.

Japanese Patent Laid-open No. 2003-274390 describes a technique for supplying image data of a surveillance image from a surveillance terminal (i.e., a surveillance camera) to a surveillance device via a network and, for example, checking a surveillance image at the time of occurrence of an abnormality using the surveillance device.

SUMMARY OF THE INVENTION

In the case where, in a surveillance system composed of a combination of the surveillance camera that generates the metadata and the control device that detects the abnormality with the metadata filter to generate the alarm, a combination of a plurality of metadata filters are set so that information of the metadata is subjected to consecutive evaluation by the plurality of metadata filters, it has been necessary to first create each of the plurality of metadata filters separately and then create, with a different screen, a setting in which these metadata filters are combined.

Further, at present, it takes effort and time to check an effect of the metadata filters or modify the setting of the metadata filters.

Still further, at present, there is a need to input numerical values for detailed setting of the metadata filters. Still further, at present, it is difficult to specify the size or moving speed of an object properly.

The present invention has been devised in view of the above situation, and an advantage of the present invention lies in enabling various settings to be performed easily and accurately.

According to one embodiment of the present invention, there is provided an image processing apparatus including: an image data acquisition section configured to acquire image data from a camera; a metadata acquisition section configured to acquire, from the camera, metadata representing information concerning an object of surveillance; a display section configured to display a setting screen usable for setting a plurality of filters; a filter setting section configured to perform filter setting using the information of the metadata; and a combination setting section configured to set a combination of the plurality of filters. The filter setting section and the combination setting section are provided on the same setting screen.

According to this embodiment, since the filter setting section and the combination setting section are provided in the single setting screen, it is possible to perform the filter setting and the combination setting simultaneously with the single screen. Thus, improvement in user-friendliness and efficiency in the settings is achieved.

The combination setting section may be a switching section configured to switch a type of the combination of the plurality of filters, the switching section being provided in the setting screen displayed on the display section.

In this case, examples of options of the type of the combination of the plurality of filters are: a parallel mode configured to output an alarm each time a condition of any of the plurality of filters is satisfied by the metadata acquired from the camera; and a sequential mode configured to output one alarm when the conditions of the plurality of filters are satisfied by the metadata acquired from the camera in a set order.

In this case, it is possible to switch the type of the combination of the filters, for example, between the parallel mode and the sequential mode by operating the combination setting section once.

The filter setting section may perform the filter setting by drawing a figure on a screen provided at a part of the setting screen and showing the image data acquired from the camera.

In this case, it is possible to perform a detailed setting of the filters not by inputting a numerical value but by drawing a figure while actually seeing an image of an object of surveillance and referring to an object (a moving object) or the like on a GUI (a setting screen). Thus, the setting can be performed visually.

According to another embodiment of the present invention, there is provided an image processing system including: a camera configured to generate image data of an image and metadata representing information concerning an object of surveillance; and an image processing apparatus. The image processing apparatus includes: an image data acquisition section configured to acquire the image data from the camera: a metadata acquisition section configured to acquire the metadata from the camera; a display section configured to display a setting screen usable for setting a plurality of filters; a filter setting section configured to perform filter setting using the information of the metadata; and a combination setting section configured to set a combination of the plurality of filters. The filter setting section and the combination setting section are provided on the same setting screen.

According to yet another embodiment of the present invention, there is provided a filter setting method including the steps of: acquiring image data from a camera; acquiring, from the camera, metadata representing information concerning an object of surveillance; displaying on a display section a setting screen having a function of setting a plurality of filters and a function of setting a combination of the plurality of filters; performing, with the setting screen, filter setting using the information of the metadata; and setting the combination of the plurality of filters with the setting screen.

According to an embodiment of the present invention, it is possible to perform various settings easily and accurately.

BRIEF DESCRIPTION OF THE DRAWINGS

FIG. 5 is a flowchart illustrating an exemplary procedure of a schedule setting section according to one embodiment of the present invention;

DETAILED DESCRIPTION OF THE PREFERRED EMBODIMENTS

Hereinafter, preferred embodiments of the present invention will be described with reference to the accompanying drawings. The embodiments described below are each a surveillance system in which a surveillance camera (a metadata generation camera) generates metadata as well as image data of an object photographed, and the metadata is analyzed to detect an abnormality and output an alarm.

Figure 1A:
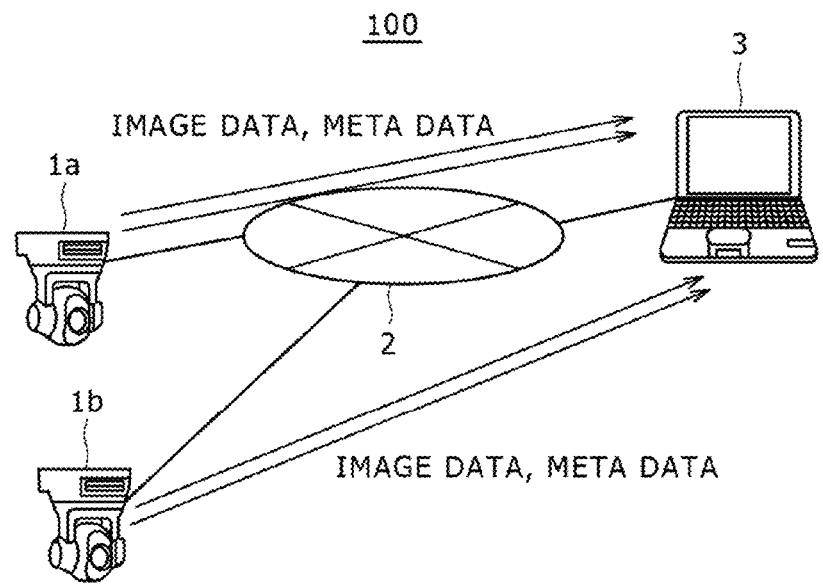
FIGS. 1A and 1B each illustrate an exemplary configuration of a surveillance system according to one embodiment of the present invention.
Figure 1B:
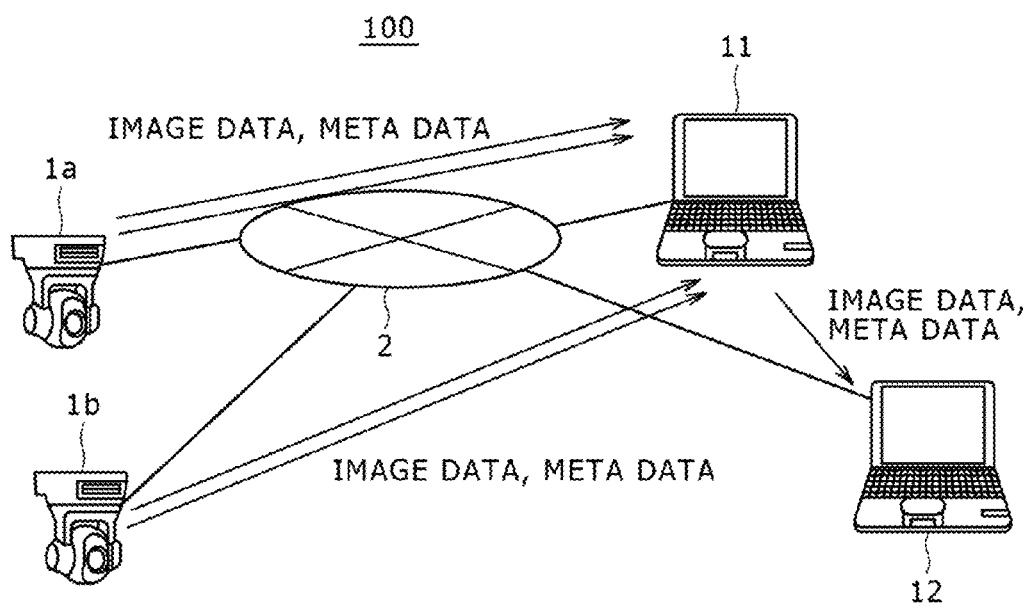

FIGS. 1A and 1B each illustrate a configuration of a surveillance system according to one embodiment of the present invention. FIG. 1A illustrates a system in which a management client acquires data outputted from a metadata generation camera via a network. FIG. 1B illustrates a system (a server/client system) in which a management server acquires data outputted from the metadata generation camera and supplies the data to an inspection client.

First, a surveillance system 100 illustrated in FIG. 1A will now be described below. As illustrated in FIG. 1A, the surveillance system 100 manages one or more metadata generation cameras. In this embodiment, the number of metadata generation cameras is assumed to be two. The surveillance system 100 is composed of: metadata generation cameras 1a and 1b that photograph an object to be watched to generate image data thereof, and also generate metadata from the image data; a management client 3 that acquires the image data and the metadata from the metadata generation cameras 1a and 1b, analyzes and stores the acquired image data and the metadata, and, if an abnormality is detected, outputs an alarm; and a network 2 that connects the metadata generation cameras 1a and 1b and the management client 3 to each other. The metadata acquired by the management client 3 from the metadata generation cameras 1a and 1b via the network 2 is analyzed via a metadata filter (hereinafter also referred to as a "filter").

Note that the numbers of metadata generation cameras, management clients, management servers, and inspection clients are not limited to those in the preferred embodiments.

The management client 3 defines a filter package (hereinafter also referred to as a "package") composed of a single filter or a combination of a plurality of filters. The management client 3 passes the metadata through the filter package to convert the metadata into alarm information based on the number of moving objects, the position of a moving object, or the like that satisfies conditions of the filters defined in the filter package. Then, the management client 3 supplies the alarm information to an analysis section for analyzing data, and the alarm information is analyzed therein. A result of the analysis of the alarm information is displayed on a display section, which is formed by a display monitor. Then, the management client 3 automatically issues, to each of the metadata generation cameras 1a and 1b, an instruction concerning a camera operation (changing magnification, sounding a buzzer, or the like) based on the result of the analysis of the alarm information. In such a manner, the management client 3 properly controls the camera operation of each of the metadata generation cameras 1a and 1b automatically or according to a manual setting by a user. The filter package and the analysis section will be described in detail later.

Here, structures of the image data and the metadata will now be described below. Each of the image data and the metadata is composed of a data body and link information. In the case of the image data, the data body is image data of a surveillance image photographed by the metadata generation camera 1a or 1b. In the case of the metadata, the data body is information representing an object watched or the like and attribute information that defines a description format of this information. Meanwhile, the link information is association information representing association between the image data and the metadata, attribute information that defines a description format of this association information, etc.

For the association information, time stamps or sequence numbers for identifying the image data are used, for example. The time stamps are information (time information) that represents a time of generation of the image data. The sequence numbers are information (sequence information) that represents an order in which pieces of content data are generated. In the case where there are a plurality of surveillance images having an identical time stamp, it is possible to identify an order in which the pieces of image data having the identical time stamp have been generated. For the association information, information (e.g., a name of a manufacturer, a name of a model, a manufacturer's serial number, etc.) for identifying a device that generates the image data may also be used.

The link information and the body of the metadata are described in a markup language, which was defined for describing information exchanged on the Web (WWW: World Wide Web). Use of the markup language makes it easy to exchange information over the network 2. Moreover, using XML (Extensible Markup Language) (which is commonly used for exchanging documents or electronic data, for example) as the markup language makes it easy to perform exchange of the image data and the metadata as well. In the case where XML is used, an XML schema is used for the attribute information that defines the description format of the information, for example.

The image data and the metadata generated by the metadata generation camera 1a or 1b may be supplied to the management client 3 as a single stream. Alternatively, the image data and the metadata may be supplied to the management client 3 as separate streams in an asynchronous manner.

Note that a surveillance system as illustrated in FIG. 1B that includes, in place of the management client 3, a management server 11 having a server function and an inspection client 12 having a client function can achieve a similar function and effect to those of the above-described surveillance system of FIG. 1A. As the server function and the client function are assigned to separate devices (i.e., the management server 11 and the inspection client 12), proper use of the management server 11 and the inspection client 12 is possible. For example, the management server 11, which has a high processing performance, is used to process a large amount of data, whereas the inspection client 12, which has a low processing performance, is used mostly to inspect results of the processing. Such distribution of functions among separate devices enables construction of the surveillance system 100 with a greater degree of flexibility.

Figure 2:
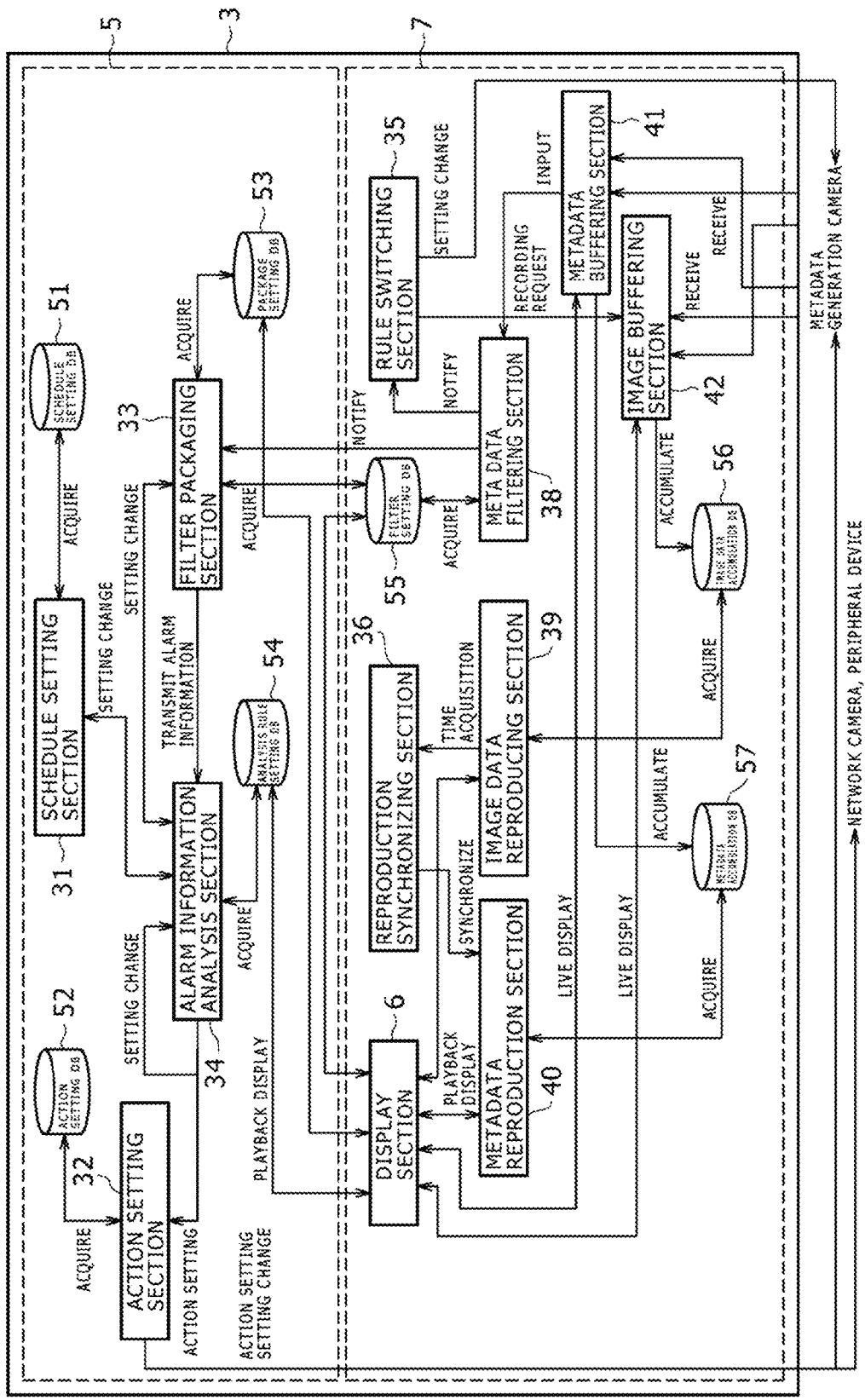
FIG. 2 is a diagram illustrating an exemplary internal structure of a management client according to one embodiment of the present invention.

Next, a detailed structure of the management client 3 in FIG. 1A will now be described below with reference to a functional block diagram of FIG. 2. Note that each of functional blocks of the management client 3 may be implemented in either hardware or software.

The management client 3 is composed of a metadata recording system 7 that accumulates and reproduces the metadata and the image data, and an analysis section 5 that analyzes the metadata. First, an exemplary structure of the metadata recording system 7 will now be described below. The metadata recording system 7 includes: an image buffering section 42 for acquiring the image data from the metadata generation camera 1a or 1b; a metadata buffering section 41 for acquiring the metadata from the metadata generation camera 1a or 1b; a filter setting database 55 for storing a filter setting corresponding to a filtering process; a metadata filtering section 38 for performing a filtering process on the metadata; a rule switching section 35 for notifying the metadata generation camera 1a or 1b of a setting change; an image data accumulation database 56 for accumulating the image data; a metadata accumulation database 57 for accumulating the metadata; an image data reproduction section 39 for reproducing the image data; a metadata reproduction section 40 for reproducing the metadata; a reproduction synchronizing section 36 for synchronizing the reproduction of the metadata and the reproduction of the image data with each other; and a display section 6 for displaying the image data, etc.

The image buffering section 42 acquires the image data from the metadata generation camera 1a or 1b and decodes the image data encoded. Then, the image buffering section 42 holds the resulting image data in a buffer (not shown) provided in the image buffering section 42. The image buffering section 42 also performs a process of supplying pieces of image data held in the buffer (not shown) sequentially to the display section 6 for displaying images. This holding of the image data in the buffer (not shown) makes it possible to supply the pieces of image data sequentially to the display section 6 regardless of reception timing of the image data acquired from the metadata generation camera 1a or 1b. In addition, based on a recording request signal supplied from the rule switching section 35 (which will be described later), the image buffering section 42 stores the image data held therein in the image data accumulation database 56. Note that the image data as encoded may be stored in the image data accumulation database 56. In this case, the encoded image data will be decoded in the image data reproduction section 39 (which will be described later).

The metadata buffering section 41 holds the metadata acquired from the metadata generation camera 1a or 1b in a buffer (not shown) provided in the metadata buffering section 41. In addition, the metadata buffering section 41 supplies pieces of metadata held therein to the display section 6 sequentially. The metadata buffering section 41 also performs a process of supplying the metadata held in the buffer (not shown) to the metadata filtering section 38 (which will be described later). This holding of the metadata in the buffer (not shown) makes it possible to supply the pieces of metadata to the display section 6 sequentially regardless of reception timing of the metadata acquired from the metadata generation camera 1a or 1b, and to supply the metadata to the display section 6 so as to be synchronized with the image data. Moreover, the metadata buffering section 41 stores the metadata acquired from the metadata generation camera 1a or 1b in the metadata accumulation database 57. When the metadata is stored in the metadata accumulation database 57, time information of the image data to be synchronized with the metadata is added to the metadata. This makes it possible to read, from the metadata accumulation database 57, metadata of a desired time by using the time information added thereto, without the need to read a content of the metadata to identify a time thereof.

The filter setting database 55 stores the filter setting corresponding to the filtering process performed in the metadata filtering section 38 (which will be described later), and also supplies the filter setting to the metadata filtering section 38. The filter setting is a setting that designates, for example, a criterion for determining whether or not output of the alarm or the like is necessary or whether or not switching of a photographing operation of the metadata generation camera 1a or 1*b* is necessary, with respect to each piece of information concerning an object of surveillance contained in the metadata. Using this filter setting when performing the filtering process on the metadata makes it possible to obtain a result of the filtering process with respect to each piece of information concerning the object of surveillance. The result of the filtering process indicates a need to output the alarm or the like, a need to switch the photographing operation of the metadata generation camera 1*a* or 1*b*, or the like.

The metadata filtering section 38 performs the filtering process on the metadata using the filter setting stored in the filter setting database 55 to determine whether or not to generate the alarm. The metadata filtering section 38 performs the filtering process on the metadata acquired by the metadata buffering section 41 or the metadata supplied from the metadata accumulation database 57, and provides notification of the result of the filtering process to the rule switching section 35 and a filter packaging section 33 (which will be described later).

Based on the result of the filtering process of which the notification has been provided from the metadata filtering section 38, the rule switching section 35 generates a setting change signal, and notifies the metadata generation camera 1*a* or 1*b* of the setting change. For example, based on the result of the filtering process obtained from the metadata filtering section 38, the rule switching section 35 switches the operation of the metadata generation camera 1*a* or 1*b* so as to obtain a surveillance image suitable for surveillance. Based on the result of the filtering process, the rule switching section 35 also supplies the recording request signal to the image data accumulation database 56, and allows the image data acquired by the image buffering section 42 to be stored in the image data accumulation database 56. Moreover, the rule switching section 35 is capable of selecting an image data accumulation mode. For example, as the image data accumulation mode, the switching section 35 is capable of selecting either a dynamic search mode or a minimum mode.

In the case where the dynamic search mode is being selected by the user, the rule switching section 35, when the result of the filtering process indicates that a moving object is being detected, allows the image data acquired by the image buffering section 42 to be stored in the image data accumulation database 56. When the dynamic search mode is being selected, the image data at a time when the moving object is being detected is stored. Thus, when the image data stored is reproduced by the image data reproduction section 39 (which will be described later) and the filtering process is performed on metadata that is synchronized with the reproduced image data using a desired filter setting, a search for image data that satisfies this filter setting is possible.

In the case where the minimum mode is being selected by the user, the rule switching section 35, when it is determined based on the result of the filtering process that a situation that performs output of a warning or the alarm has arisen, allows the image data acquired by the image buffering section 42 to be stored in the image data accumulation database 56. When the minimum mode is being selected, it is possible to easily and quickly reproduce image data of an image showing a situation that performs the output of the warning or the alarm. Moreover, when the minimum mode is being selected, reduction in the amount of the image data accumulated is achieved.

The image data accumulation database 56 stores the image data acquired by the image buffering section 42. The metadata accumulation database 57 stores the metadata acquired by the metadata buffering section 41.

The image data reproduction section 39 reproduces the image data stored in the image data accumulation database 56. Specifically, the image data reproduction section 39 sequentially reads pieces of image data, starting with a reproduction position specified by the user, and supplies the pieces of image data read to the display section 6. In addition, the image data reproduction section 39 supplies a reproduction position (i.e., a reproduction time) of image data being reproduced to the reproduction synchronizing section 36.

The reproduction synchronizing section 36 used for synchronizing the reproduction of the metadata and the reproduction of the image data with each other controls an operation of the metadata reproduction section 40 by supplying a synchronization control signal to the metadata reproduction section 40 so that the reproduction position supplied from the image data reproduction section 39 will be in synchronism with a reproduction position of the metadata stored in the metadata accumulation database 57 and reproduced by the metadata reproduction section 40.

The metadata reproduction section 40 reproduces the metadata stored in the metadata accumulation database 57. Specifically, the metadata reproduction section 40 sequentially reads the pieces of metadata, starting with the reproduction position specified by the user, and supplies the read metadata to the metadata filtering section 38 and the display section 6. In the case where both the image data and the metadata are reproduced, the metadata reproduction section controls its reproduction operation based on the synchronization control signal supplied from the reproduction synchronizing section 36 as described above, thereby outputting the metadata so as to be synchronized with the image data.

The display section 6 displays the (live) image data supplied from the image buffering section 42, the reproduced image data supplied from the image data reproduction section 39, the (live) metadata supplied from the metadata buffering section 41, or the reproduced metadata supplied from the metadata reproduction section 40. Based on the filter setting supplied from the metadata filtering section 38, the display section 6 also displays an image showing a result of surveillance based on the result of the filtering process, using one of the surveillance image, an image of the metadata, and an image of the filter setting or a combination thereof.

The display section (i.e., a display module) 6 also functions as a graphical user interface (GUI). By selecting a filter setting menu or the like displayed on the display section 6 using an operation key, a mouse, a remote control (which are not shown), or the like, the user is able to define a package or a filter or display a GUI concerning a result of analysis of the alarm information, the package, or the like as well as information of each processing unit (module).

When functioning as the GUI, the display section 6 functions as a filter setting section for performing filter setting using information of the metadata and as a combination setting section for setting a combination of a plurality of filter settings which have been set with the filter setting section. When the package is defined, for example, the display section 6 creates a new filter setting or edits the filter setting stored in the filter setting database 55 via the GUI function in accordance with a user instruction, and then performs package setting (i.e., sets a manner of combining the filters). In the present embodiment, the individual filter settings are stored in the filter setting database 55, whereas a package setting (the combination of filters, etc.) is stored in a package setting database 53. Note that the filter setting database 55 and the package setting database 53 may be constructed as a single database.

The surveillance system 100 according to the present embodiment includes: the filter packaging section 33 for performing analysis and determining whether or not to generate the alarm while combining the plurality of filters; the package setting database 53 for storing information of the filters within the filter package and association (logical setting) between the filters; an alarm information analysis section 34 for analyzing alarm information outputted from the filter packaging section 33 based on a set value in an analysis rule setting database 54 which will be described later; a schedule setting section 31 for monitoring a schedule and setting a specified analysis rule, package, and action (an instruction concerning an operation of an external device) in a specified time period; a schedule setting database 51 for recording settings of the package and the action; an action setting section 32 for issuing an instruction for the action to various cameras or peripheral devices; and an action setting database 52 for recording the setting of the action.

Exemplary functions of the above parts and databases will now be described in detail below.

The filter packaging section 33 combines a plurality of pieces of alarm information acquired from the metadata filtering section 38 to determine whether the package should generate the alarm. The user is able to set optimum camera operations beforehand on a filter-by-filter basis or on a package-by-package basis. It is assumed here that the user has set five types of filters (filters A to E) in a certain package. As the types of filters that can be set, there are seven types of filters as listed below, for example, and the user can select arbitrary types of filters from among these filters.

Appearance: a filter for determining whether or not an object exists in a certain area.

Disappearance: a filter for determining whether or not an object has appeared in a certain area and disappeared from the area.

Passing: a filter for determining whether or not an object has passed over a certain boundary line.

Capacity: a filter for determining whether or not the number of objects in a certain area has exceeded a predetermined value.

Loitering: a filter for determining whether or not an object has been loitering in a certain area longer than a predetermined time.

Unattended: a filter for determining whether or not an object has intruded into a certain area and remains unmoved longer than a predetermined time.

Removed: a filter for detecting that an object present in a certain area has been removed therefrom.

In the setting of the package, various logical relationships can be freely set among the filters. For example, the package may be set such that the alarm information will be outputted when conditions of all filters are satisfied, or such that the alarm information will be outputted when settings of both filter A and filter B are satisfied or when settings of both filter C and filter D are satisfied. Specifically, for example, the alarm information of the package is generated when a person has intruded into a certain place (i.e., filter A "Appearance" for the certain place is true) and a watchman is not present at a specified place (i.e., filter B "Disappearance" for another place is true).

The package setting database 53 is a database capable of storing the package defined in the filter packaging section 33. Examples of information to be stored in this database are listed below.

1. A package number (or a package name): used for identifying the filter package uniquely.

2. A filter number (or a filter name): used for identifying the filter alarm information uniquely. In the case where filter alarm numbers are assigned on a camera-by-camera basis, a camera number may also be required.

3. Logical relationship between filters: logic specifying how the filters are combined, and composed of a combination of logical products (AND, or sequential) and a combination of logical sums (OR, or parallel).

The alarm information analysis section 34 analyzes the alarm information obtained from the filter packaging section 33 to control the camera or peripheral device to perform its optimum operation, and supplies information to the display section 6. Examples of types of the analysis that can be selected include: "continuous time" (in the case where alarms come continuously only within a specified time, even an impulse-wave alarm is regarded as a square-wave alarm); "generation frequency" (more than a specified number of pieces of alarm information are obtained within a specified time); and "occupied area" (an object occupies more than a specified proportion of a specified range). In addition, the user is able to define a new type of the analysis. Based on a result of the analysis, re-selection of the package, execution of various actions, change of the schedule, or the like is performed.

The analysis rule setting database 54 is a database capable of storing an analysis rule defined in the alarm information analysis section 34. Examples of information to be stored in this database are listed below.

1. An analysis rule number (or an analysis rule name): used for identifying alarm analysis information uniquely.

2. A package number (or a package name): used for identifying the package used in alarm analysis uniquely.

3. An analysis type: the type of the analysis such as "continuous time", "generation frequency", or "occupied area".

4. A detailed analysis setting: a detailed setting item (a time, a threshold frequency, or the like) necessary for the analysis type; an operation to be performed when the condition is satisfied, such as execution of the action, the change of the package, the change of the analysis rule, etc.

The schedule setting section 31 changes the analysis rule depending on a time period. For example, during business hours, the analysis is performed using the "generation frequency" rule in order to detect a situation of an object being caught in an automatic door, for example, whereas after a closing time, the analysis rule is switched to "intrusion" alarm so that detection of intrusion is determined to be occurrence of an alarm situation.

The schedule setting database 51 is a database capable of storing the schedule defined in the schedule setting section 31. Examples of information to be stored in this database are listed below.

1. A schedule number (or a schedule name): used for identifying schedule information uniquely.

2. A start time: a time (year, month, day, hour, minute, second) at which the schedule is started.

3. An end time: a time (year, month, day, hour, minute, second) at which the schedule is ended.

4. An analysis rule number: a number for identifying the analysis rule applied in the schedule.

Based on a result of the analysis of the alarm information, the action setting section 32 executes a specified action. If an action such as "tracking", "zooming", or "light ON" has been specified, a zoom ratio, a pan/tilt angle, or the like is automatically specified based on information of the number of moving objects or position information contained in the alarm information. In addition, it is possible to set details of an action manually. It is also possible to change the setting of the camera. Besides changing the setting of the camera, it is possible to switch a recording mode between a dynamic search mode and a minimum recording mode. In the dynamic search mode, image recording is performed whenever there is a moving object detected, so that the filter can be dynamically changed later to search for a relevant image. In the minimum recording mode, image recording is performed only when filter detection has occurred.

The action setting database 52 is a database capable of storing an action setting. Examples of information to be stored in this database are listed below.

1. An action number (or an action name): used for identifying action setting information uniquely.
2. An action type: "panning/tilting", "zooming", "light ON", or the like.
3. A detailed setting: used for setting detailed information in the case of manual setting.

<Description of Operation>

Next, exemplary processes of the parts of the management client 3 will now be described below.

Figure 3:
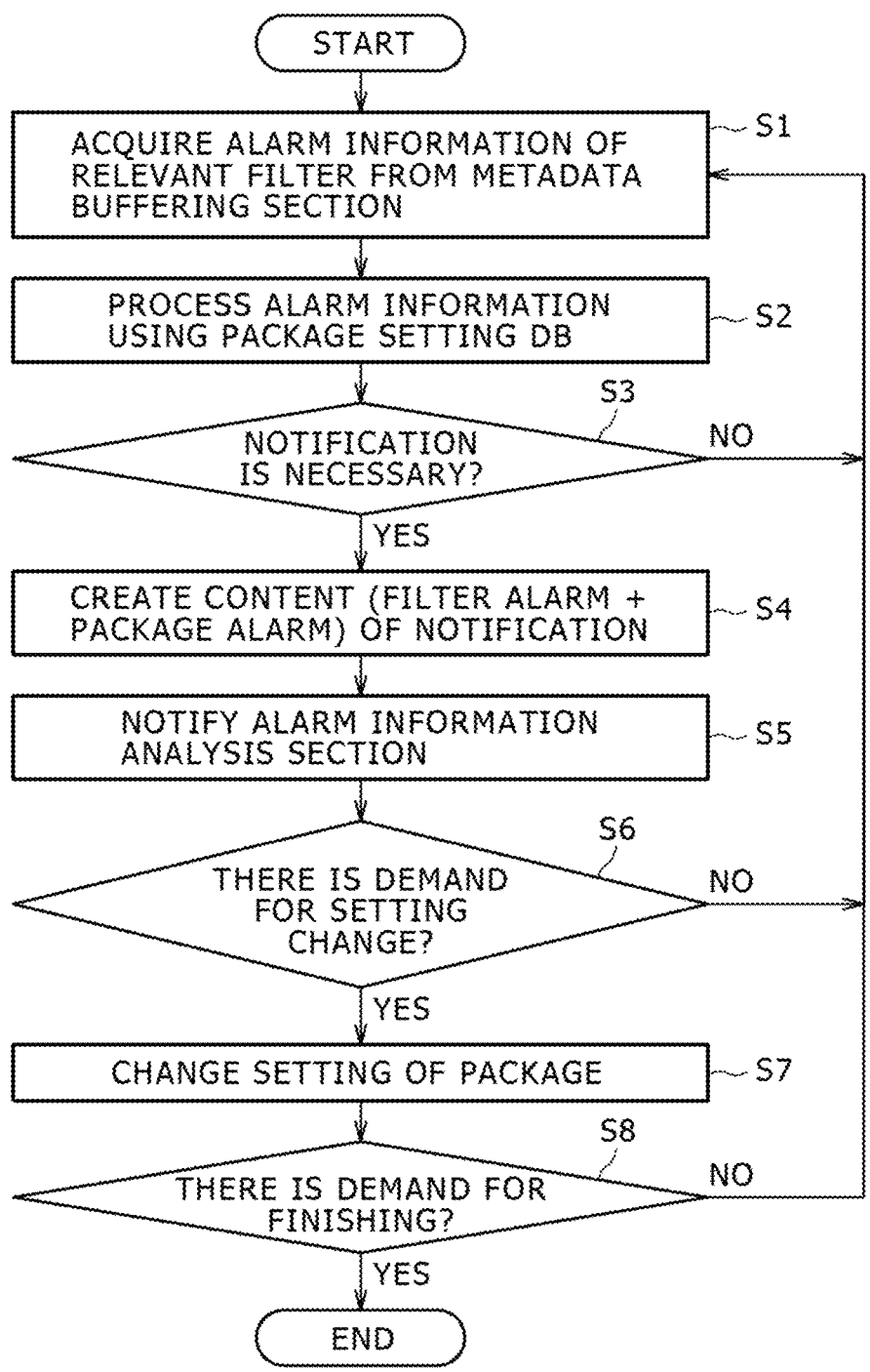
FIG. 3 is a flowchart illustrating an exemplary procedure of a filter packaging section according to one embodiment of the present invention.

First, an exemplary process of the filter packaging section 33 will now be described below with reference to FIG. 3. The filter packaging section 33 performs a process of creating the package by logically combining the plurality of filters, and making notification. First, the filter packaging section 33 acquires the alarm information of a relevant filter from the metadata buffering section 41 (step S1). Next, the filter packaging section 33 processes the alarm information using the package setting database 53 used by each package (step S2).

After processing the alarm information, the filter packaging section 33 determines whether it is necessary to make notification to the alarm information analysis section 34 (step S3). If it is determined that the notification is not necessary, the filter packaging section 33 returns to step S1. Meanwhile, if it is determined that the notification is necessary, the filter packaging section 33 creates a content of the notification, i.e., a combination of a filter alarm and a package alarm (step S4). Then, the filter packaging section 33 notifies the alarm information analysis section 34 of the content of the notification (step S5).

Next, the filter packaging section 33 determines whether there is a demand for changing the setting of the package (step S6). If it is determined that there is not a demand for changing the setting of the package, the filter packaging section 33 returns to step S1. Meanwhile, if it is determined that there is a demand for changing the setting of the package, the filter packaging section 33 changes the setting of the package (step S7).

Then, the filter packaging section 33 determines whether there is a demand for finishing the process (step S8). If it is determined that there is not a demand for finishing the process, the filter packaging section 33 returns to step S1. Meanwhile, if it is determined that there is a demand for finishing the process, the filter packaging section 33 finishes the process.

Figure 4:
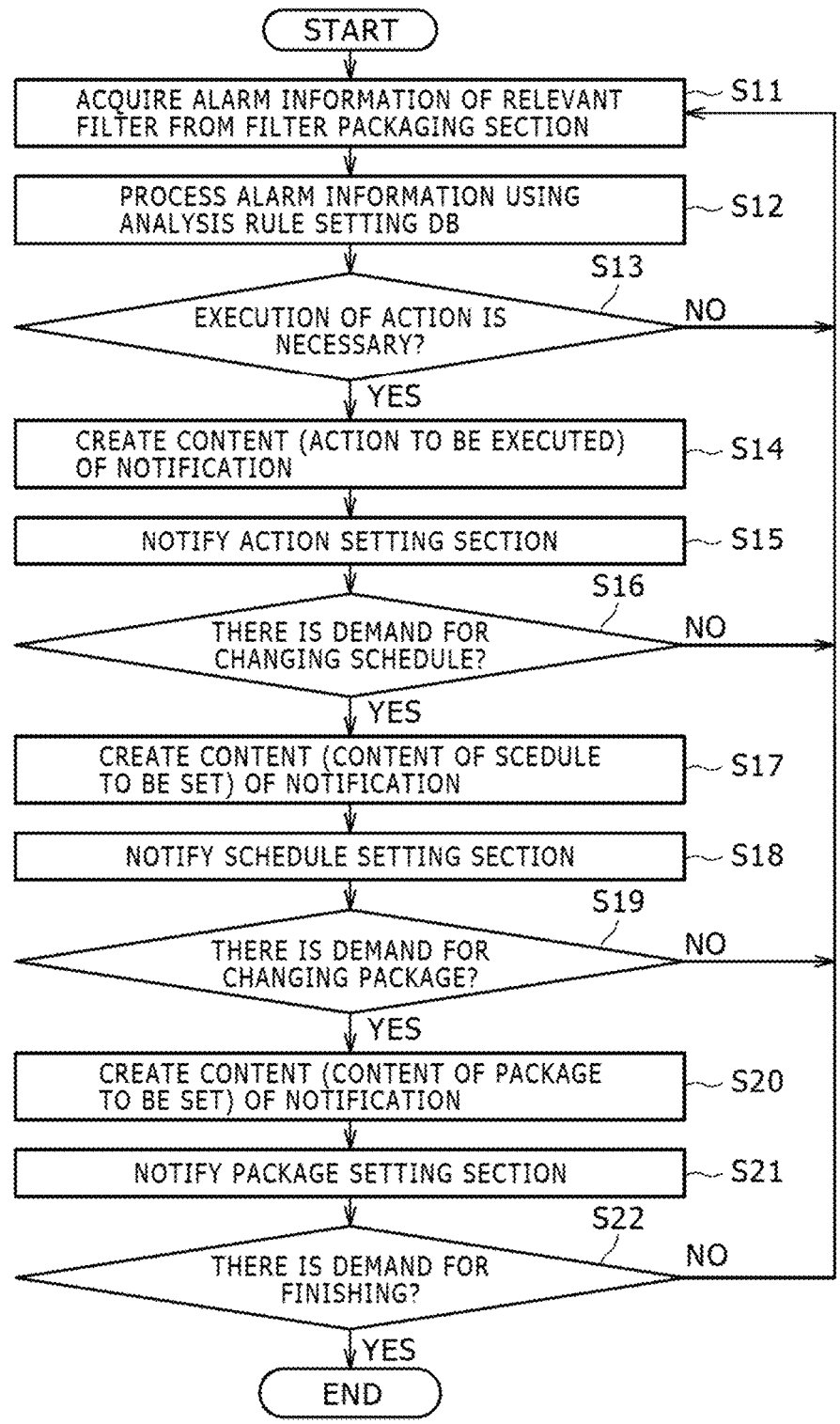
FIG. 4 is a flowchart illustrating an exemplary procedure of an alarm information analysis section according to one embodiment of the present invention.

Next, an exemplary procedure of the alarm information analysis section 34 will now be described below with reference to FIG. 4. The alarm information analysis section 34 performs a process of analyzing the acquired alarm information to issue an instruction for the execution of the action, the change of the schedule, or the change of the package. First, the alarm information analysis section 34 acquires the alarm information of the relevant filter from the filter packaging section 33 (step S11). Next, the alarm information analysis section 34 processes the alarm information using the analysis rule setting database 54 (step S12).

After processing the alarm information, the alarm information analysis section 34 determines whether it is necessary to execute the action (step S13). If it is determined that the execution of the action is not necessary, the alarm information analysis section 34 returns to step S11. Meanwhile, if it is determined that the execution of the action is necessary, the alarm information analysis section 34 creates a content of notification describing the action to be executed (step S14). Then, the alarm information analysis section 34 notifies the action setting section 32 of the content of the notification (step S15).

Next, the alarm information analysis section 34 determines whether there is a demand for changing the schedule (step S16). If it is determined that there is not a demand for changing the schedule, the alarm information analysis section 34 returns to step S11. Meanwhile, if it is determined that there is a demand for changing the schedule, the alarm information analysis section 34 creates a content of notification describing a content of schedule to be set (step S17). Then, the alarm information analysis section 34 notifies the schedule setting section 31 of the content of the notification (step S18).

Next, the alarm information analysis section 34 determines whether there is a demand for changing the package (step S19). If it is determined that there is not a demand for changing the package, the alarm information analysis section 34 returns to step S11. Meanwhile, if it is determined that there is a demand for changing the package, the alarm information analysis section 34 creates a content of notification describing a content of a package to be set (step S20). Then, the alarm information analysis section 34 notifies the filter packaging section 33 of the content of the notification (step S21).

Then, the alarm information analysis section 34 determines whether there is a demand for finishing the process (step S22). If it is determined that there is not a demand for finishing the process, the alarm information analysis section 34 returns to step S11. Meanwhile, if it is determined that there is a demand for finishing the process, the alarm information analysis section 34 finishes the process.

Next, an exemplary procedure of the schedule setting section 31 will now be described below with reference to FIG. 5. The schedule setting section 31 performs a process of creating the schedule and executing the specified analysis rule within a period of the schedule. First, with respect to each schedule, the schedule setting section 31 processes the schedule information using the schedule setting database 51 (step S31).

After processing the schedule information, the schedule setting section 31 determines whether the present time is in the period of the schedule (step S32). If it is determined that the present time is not in the period of the schedule, the schedule setting section 31 returns to step S31. Meanwhile, if it is determined that the present time is in the period of the schedule, the schedule setting section 31 creates a content of notification describing the analysis rule (step S33). Then, the schedule setting section 31 notifies the alarm information analysis section 34 of the content of the notification (step S34).

Then, the schedule setting section 31 determines whether there is a demand for changing the setting of the schedule (step S35). If it is determined that there is not a demand for changing the setting of the schedule, the schedule setting section 31 returns to step S31. Meanwhile, if it is determined that there is a demand for changing the setting of the schedule, the schedule setting section 31 changes the setting of the schedule using the schedule setting database 51 (step S36).

Then, the schedule setting section 31 determines whether there is a demand for finishing the process (step S37). If it is determined that there is not a demand for finishing the process, the schedule setting section 31 returns to step S31. Meanwhile, if it is determined that there is a demand for finishing the process, the schedule setting section 31 finishes the process.

Figure 6:
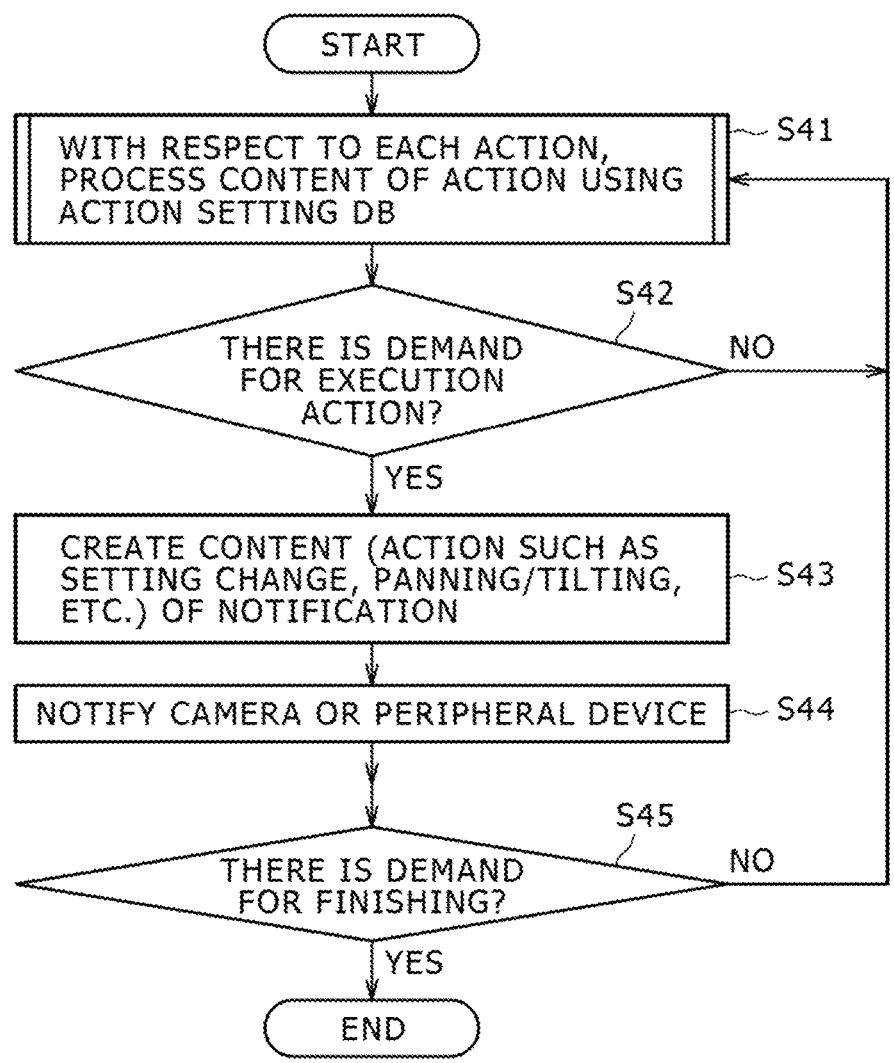
FIG. 6 is a flowchart illustrating an exemplary procedure of an action setting section according to one embodiment of the present invention.

Next, an exemplary procedure of the action setting section 32 will now be described below with reference to FIG. 6. The action setting section 32 performs a process of creating the action to allow the camera or the peripheral device to execute the action. First, with respect to each action, the action setting section 32 processes a content of the action using the action setting database 52 (step S41).

After processing the content of the action, the action setting section 32 determines whether there is a demand for executing the action (step S42). If it is determined that there is not a demand for executing the action, the action setting section 32 returns to step S41. Meanwhile, if it is determined that there is a demand for executing the action, the action setting section 32 creates a content of notification describing the action, such as the change of the setting of the action, the panning/tilting, or the like (step S43). Then, the action setting section 32 notifies the camera, the peripheral device, or the like of the content of the notification (step S44).

Then, the action setting section 32 determines whether there is a demand for finishing the process (step S45). If it is determined that there is not a demand for finishing the process, the action setting section 32 returns to step S41. Meanwhile, if it is determined that there is a demand for finishing the process, the action setting section 32 finishes the process.

Next, an exemplary procedure performed by the above modules in conjunction with one another will now be described below.

Figure 7:
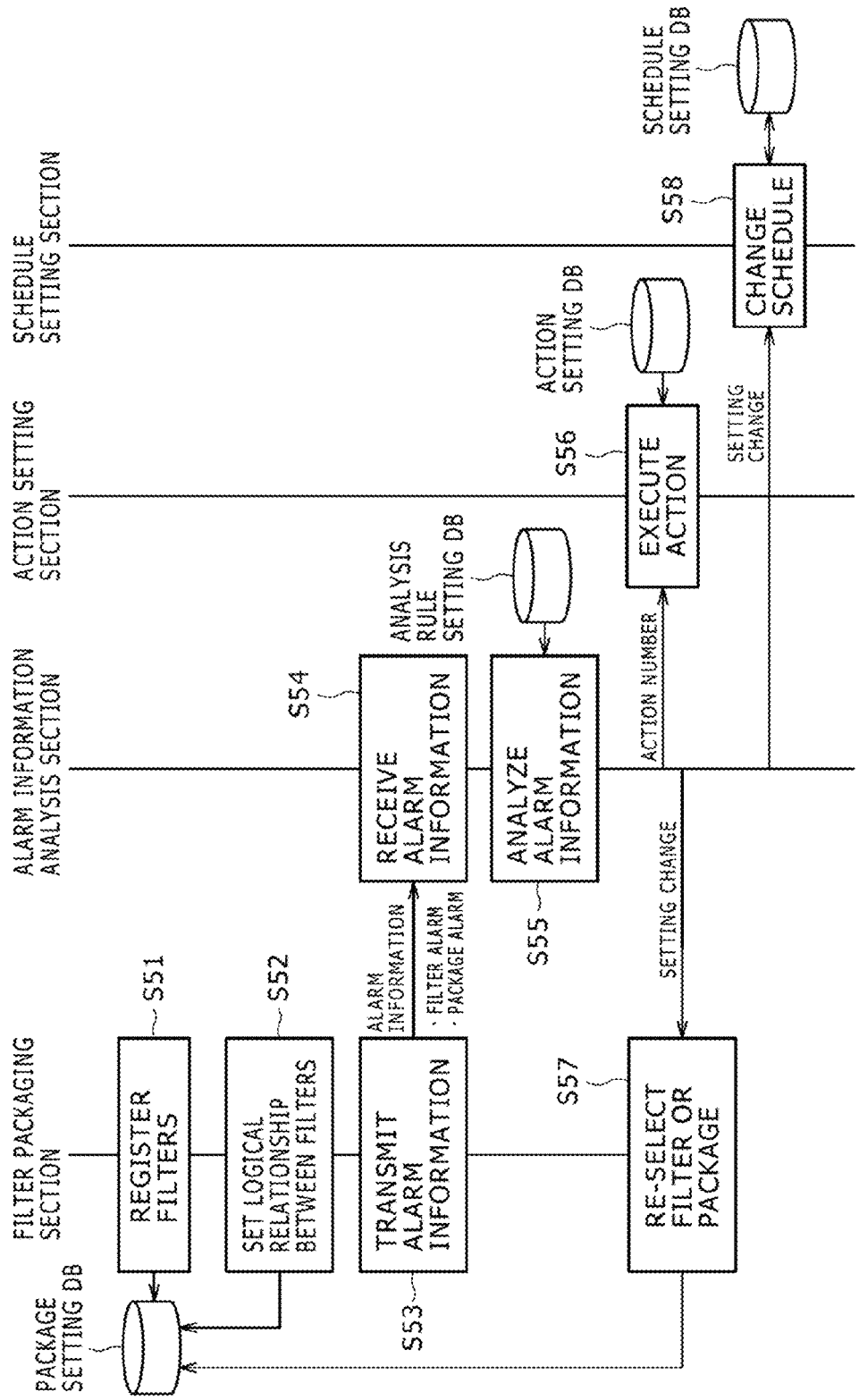
FIG. 7 is a flowchart illustrating an exemplary process in the case where a filter package is applied to metadata, according to one embodiment of the present invention.

First, an exemplary process for obtaining one result while the package (i.e., the collection of filters) is applied to the metadata received from the plurality of metadata generation cameras 1a and 1b will now be described below with reference to FIG. 7. First, the user registers the filters, such as "Appearance", "Loitering", etc., using the filter packaging section 33 (step S51), and sets the logical relationship between the filters (step S52). The content of this setting is stored in the package setting database 53.

Then, the filter packaging section 33 transmits the alarm information to the alarm information analysis section 34 (step S53). The alarm information analysis section 34 receives the alarm information from the filter packaging section 33 (step S54). The alarm information received contains not only the filter alarm from each filter but also the package alarm from the package corresponding to the new logical relationship between the filters.

The alarm information analysis section 34 analyzes the received alarm information based on the analysis rule setting database 54, and performs an operation according to the analysis rule (step S55). Then, the alarm information analysis section 34 transmits a necessary instruction to the action setting section 32, the filter packaging section 33, and the schedule setting section 31. When any action is to be executed, the alarm information analysis section 34 specifies the action number thereof for the action setting section 32. The action setting section 32 reads, from the action setting database 52, an action corresponding to the specified action number and executes the action (step S56). When any filter or package is to be re-selected, the alarm information analysis section 34 instructs the filter packaging section 33 to change its setting. The filter packaging section 33 reads the filter or package from the package setting database 53, and writes the re-selected filter or package to the package setting database 53 (step S57). When the schedule is to be changed, the alarm information analysis section 34 instructs the schedule setting section 31 to change its setting. The schedule setting section 31 reads the schedule from the schedule setting database 51, and writes the changed schedule to the schedule setting database 51 (step S58).

Figure 8:
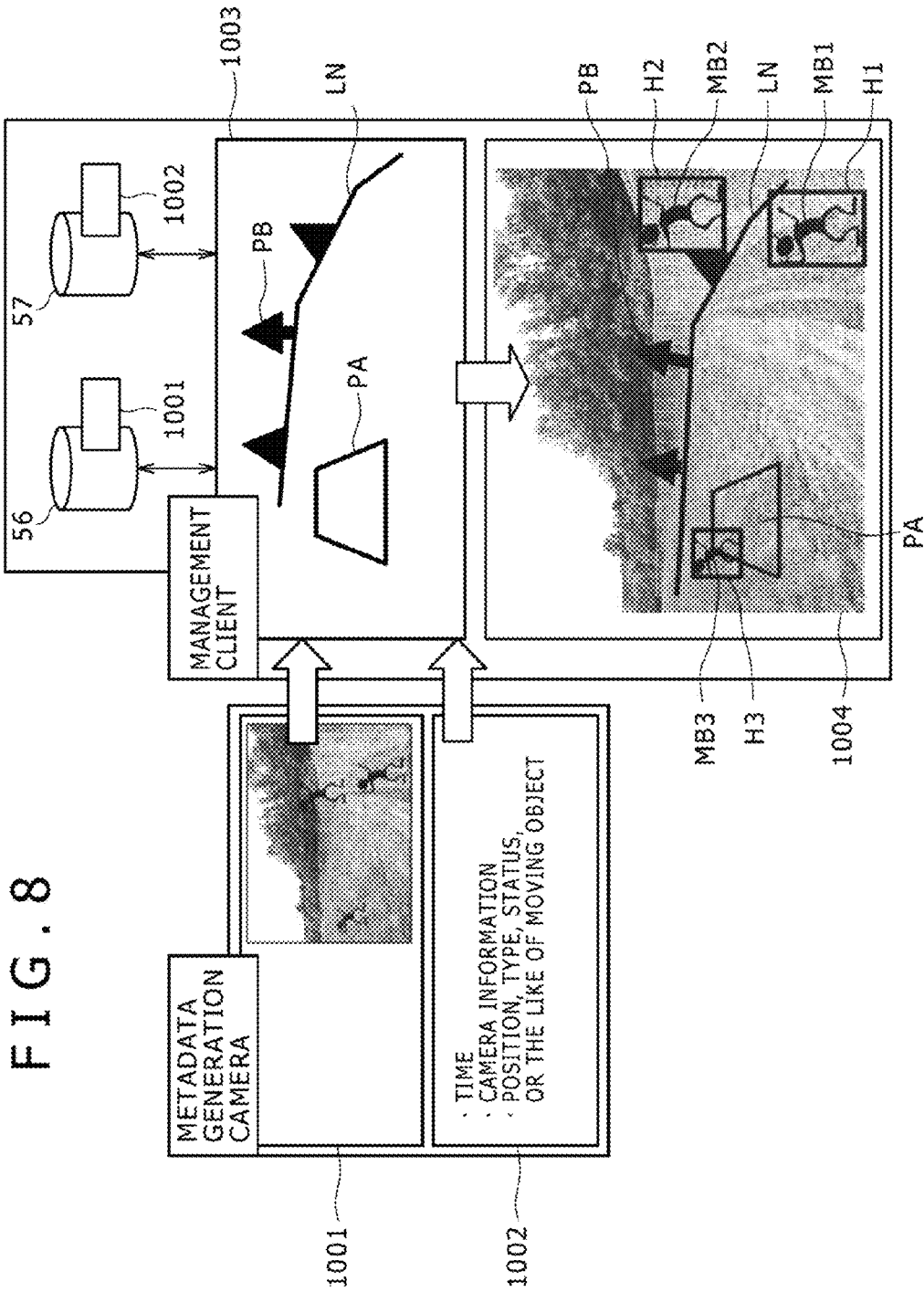
FIG. 8 illustrates examples of image data and the metadata as displayed according to one embodiment of the present invention.

Next, a method for setting the filter package in the management client 3 will now be described below. FIG. 8 illustrates examples of the image data and the metadata displayed on the display section 6 of the management client 3 according to the present embodiment.

As illustrated in FIG. 8, image data 1001 captured by the metadata generation camera 1a or 1b and metadata 1002 are supplied to the management client 3 via the network 2. Examples of types of the metadata generated by the metadata generation camera 1a or 1b include a time, information (e.g., a position, a type, a status, or the like) of the moving object resulting from image analysis, and a current camera state. Note that the metadata generation camera may be equipped with a software module contained in the management client or the management server so as to operate without the network.

As described above, the management client 3 acquires the image data 1001 and the metadata 1002 from the metadata generation camera 1a or 1b, and analyzes and stores them. The image data 1001 and the metadata 1002 inputted to the management client 3 are stored in the image data accumulation database 56 and the metadata accumulation database 57, respectively. The management client 3 has a filter setting function, and performs various filter settings with a filter setting screen (a filter setting menu) displayed on the display section 6 and stores the information of the filter in the filter setting database 55. In a filter setting display screen 1003 as illustrated in FIG. 8, a boundary line LN and an area PA generated by the filter setting are shown. An arrow PB indicates a passing direction. Using the information of the filter set in such a manner, the metadata filtering section 38 detects objects (moving objects) MB1 to MB3 in the image, and the display section 6 displays a surveillance image 1004 that represents the objects MB1 to MB3 so as to be synchronized with the image data 1001. When an object is detected by any filter, the surveillance system 100 generates the alarm. For example, moving object frames H1 to H3 are displayed so as to enclose the detected objects MB1 to MB3.

Figure 9:
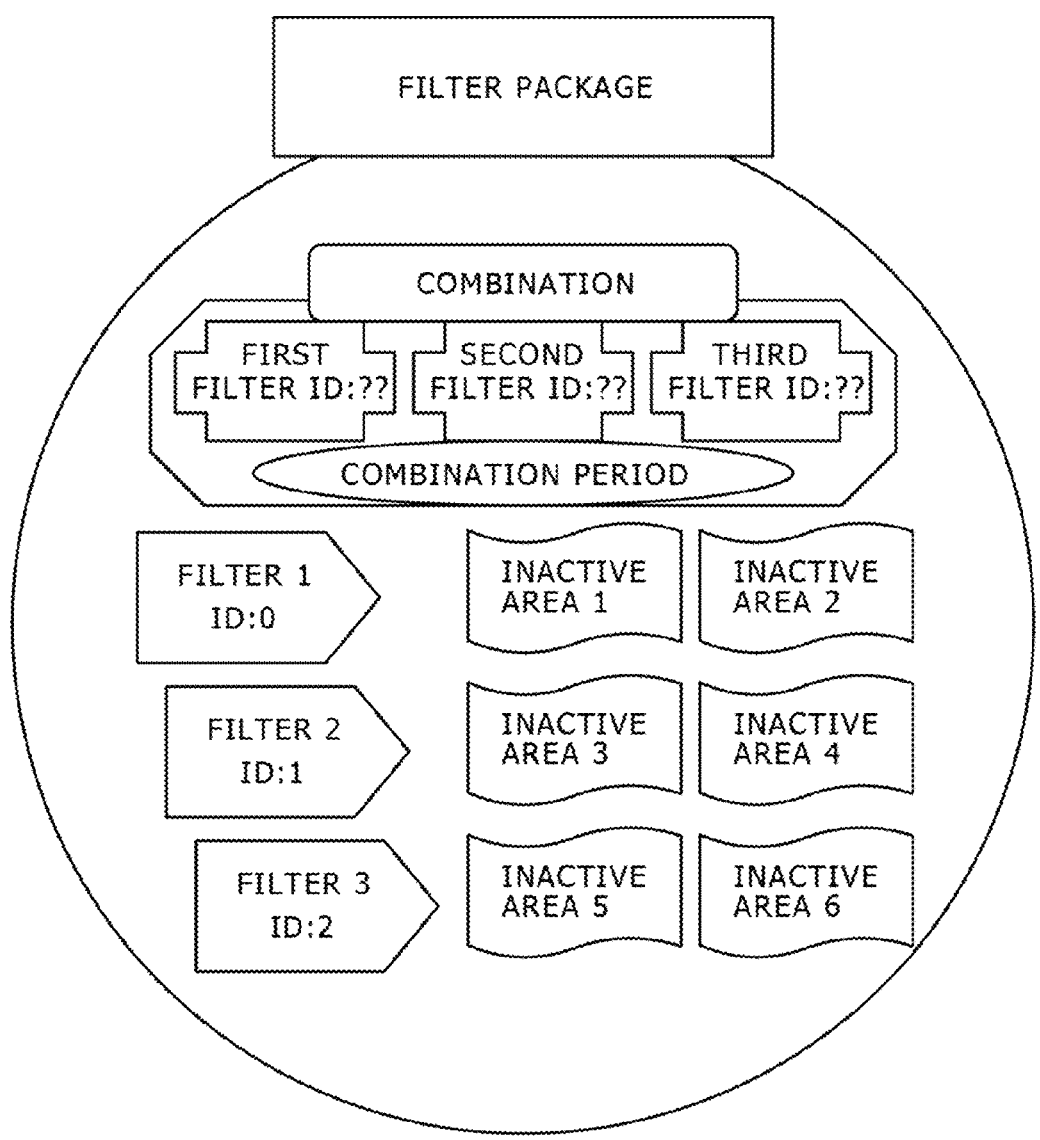
FIG. 9 is a diagram for explaining a concept of the filter package according to one embodiment of the present invention.

FIG. 9 illustrates a concept of the filter package composed of a single filter or a combination of a plurality of filters. In FIG. 9, the plurality of filters for the metadata are packaged. In this example, one package is composed of a combination of a maximum of three filters and a maximum of six inactive areas.

There are two combination types: a sequential mode and a parallel mode. In the parallel mode, each time any filter detects any object, the alarm of the package is generated. Meanwhile, in the sequential mode, when the filters detect an object in a set order within a range of a predetermined combination period, one alarm of the package is generated. The package is set individually for each metadata generation camera.

<Description of Setting Operation>

Figure 10:
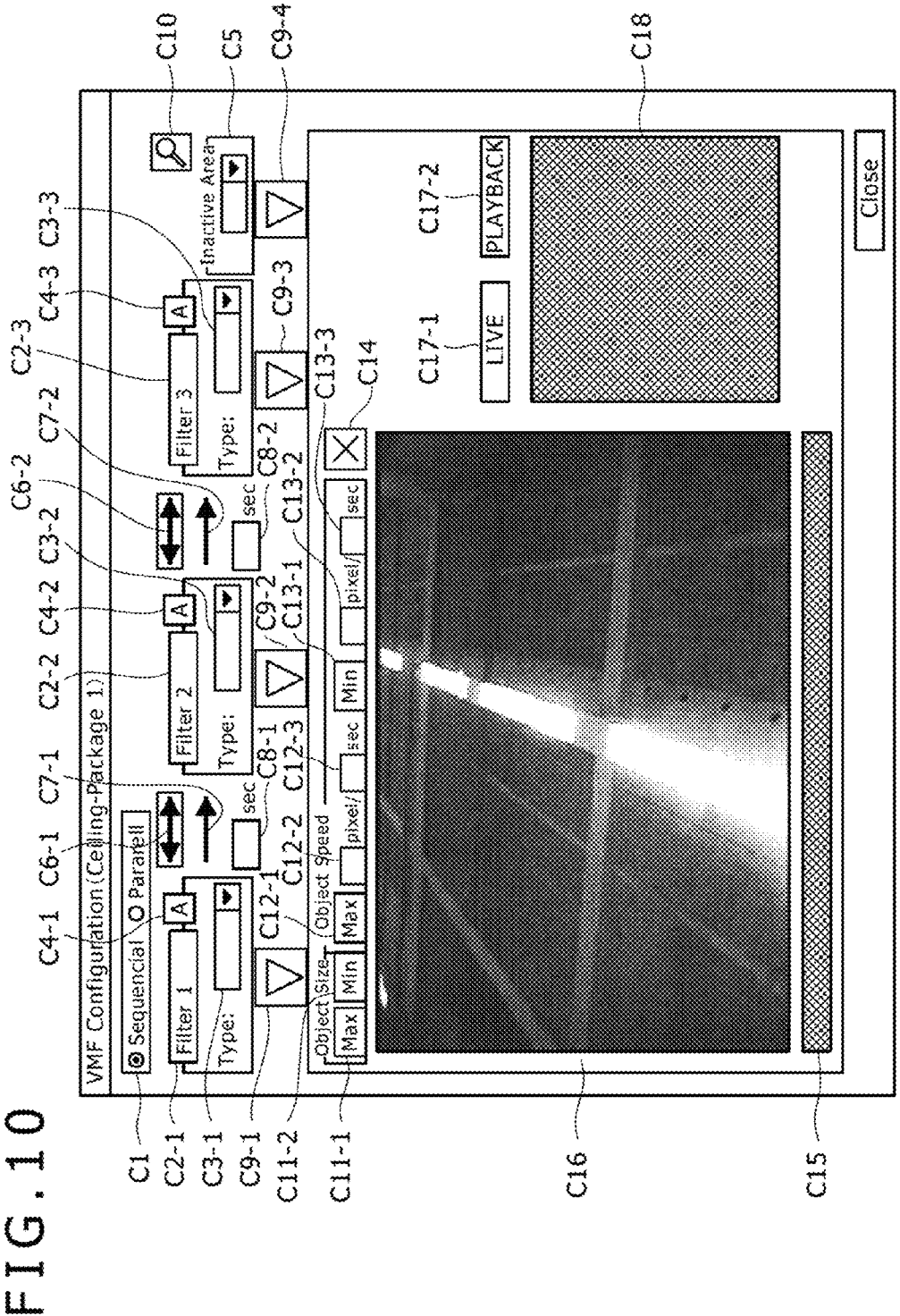
FIG. 10 is a diagram illustrating an exemplary package setting screen according to one embodiment of the present invention.

FIG. 10 is a schematic diagram of a package setting screen. In this package setting screen, it is possible to set one package with one setting operation.

[Filter Outline Setting]

Filter Name

Areas C2 are used to assign names to the three filters. Default of filter names C2-1, C2-2, and C2-3 are Filter 1, Filter 2, and Filter 3, respectively.

Filter Type Selection

Filter type lists C3-1, C3-2, and C3-3 are used to select a filter type for each of the three filters. Examples of the filter type that can be selected in the present embodiment are the following seven types, for example: Appearance; Disappearance; Loitering; Capacity; Passing; Unattended; and Removed.

Enable/Disable

Enable/disable buttons C4-1, C4-2, and C4-3 are used to specify whether or not each of the filters is used. Even when detailed filter settings have been made, the filter in a "disabled" status is not used in the filtering process. Since even the filter in the "disabled" status keeps its settings preserved, it is easy to return the filter into a usable status. In this embodiment, "A" is shown when the filter is set to be effective ("enabled").

In FIG. 10, each of the enable/disable buttons C4-1 to C4-3 for Filters 1 to 3 shows "A", meaning that each of the three filters is effective ("enabled"). If the enable/disable button C4-2 for Filter 2 were set to be ineffective ("disabled"), it would follow that the package is constituted by Filter 1 and Filter 3. In this case, in the filter package as illustrated in FIG. 9, filter 1 identified by filter ID 0 and filter 3 identified by filter ID 2 would be set as first and second filters, respectively.

[Combination Setting]

Sequential/Parallel

Selection of a combination setting C1 (i.e., the sequential mode or the parallel mode) is possible by means of radio buttons. In the case where the parallel mode is selected, the alarm of the package will be generated whenever any of Filters 1 to 3 detects the object. On the other hand, in the case where the sequential mode is selected, the alarm of the package will be generated only when Filters 1 to 3 detect the object in the set sequence. In the case where the sequential mode is selected, the alarm will not be generated when Filter 2 detects the object before Filter 1. When the sequential mode is being selected, arrow-shaped sequential mode indicators C7-1 and C7-2 are displayed to make it apparent that the filters have a sequential relationship therebetween. When the parallel mode is being selected, the arrow-shaped sequential mode indicators C7-1 and C7-2 are not displayed, so that it is apparent that the filter settings are parallel.

Change of Order of Filters

Filter switch buttons C6-1 and C6-2 are used to change an order in which the filters are evaluated. The filter switch button C6-1 is used to reverse the order of Filter 1 and Filter 2, whereas the filter switch button C6-2 is used to reverse the order of Filter 2 and Filter 3. This eliminates the need to make the settings of the filters again when the order of the filters have been changed.

Filter Evaluation Interval

By entering a numerical value in "filter evaluation interval input boxes" C8-1 and C8-2, it is possible to change a treatment of object detection intervals between the filters. Even when first Filter 1 and then Filter 2 detect the object in succession, the alarm of the package will not be generated if an interval between the first detection (by Filter 1) and the second detection (by Filter 2) is longer than a predetermined time.

[Inactive Area Setting]

An inactive area list C5 is used to specify an area (i.e., an inactive area) with respect to which the detection is not performed when subjecting the object to filtering. A maximum of six inactive areas can be set in one package. The size of each inactive area is changeable.

[Filter Detection Area Setting and Check of Effect]

Pressing one of filter setting edition buttons C9-1, C9-2, and C9-3 makes it possible to check an effect of the corresponding filter with a screen C16 provided at a corner of the setting screen. Only one of the buttons C9-1 to C9-3 can be pressed at a time. When pressed, any of the buttons C9-1 to C9-3 enters a depressed state, making it apparent which filter is being set/checked at the moment. These buttons C9-1 to C9-3 are independent of the statuses of the enable/disable buttons C4-1 to C4-3, and thus it is possible to check the setting of the filter in the "disabled" status as well. A filter detection area is set not with a numerical value but by figure drawing. A manner of setting the filter detection area (i.e., a method of figure drawing) varies depending on the filter type.

Figure 11:
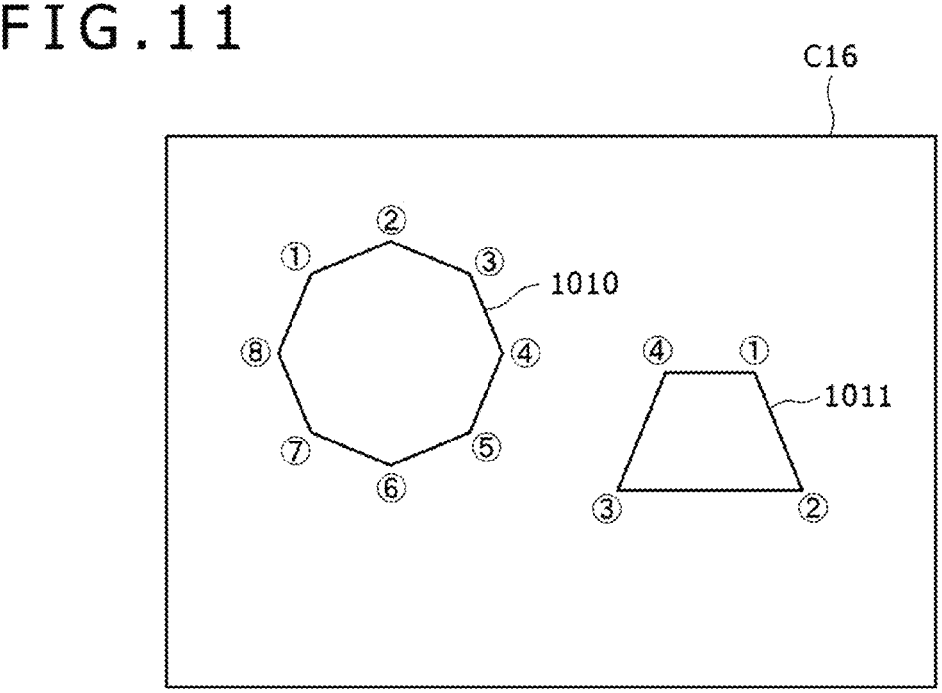
FIG. 11 is a diagram for explaining a polygon drawing method according to one embodiment of the present invention.

Polygon drawing method: Appearance, Disappearance, Loitering, Capacity, Unattended, and Removed An area is set by using the mouse (i.e., an example of a pointing device) to left-click on and thus specify vertices of a polygon on the screen C16. The polygon that can be set in the present embodiment is a convex polygon having a maximum of eight vertices. After a starting point is determined, an arbitrary point on the screen is left-clicked on to determine the next vertex of the polygon. The neighboring vertices are joined together by a straight line as soon as they are determined. Selection of the vertices can be performed only in a single direction, a clockwise direction or a counterclockwise direction. When an eighth vertex is selected, a polygon 1010 is automatically created (see FIG. 11). In the case where a polygon 1011 having less than eight vertices is to be created, the user may select, as the next click point, a point at which the user likes to close the polygon, or double-click on the next click point. As a result, an inner area of the polygon 1011 is set as a filtering area (see FIG. 11). The user is able to cancel determination of a previous point with a right-click. In the case where the polygon is not created, the largest square corresponding to the size of the image is automatically set as the detection area, for example.

Arrow-Attached Line Drawing Method: Passing

Figure 12:
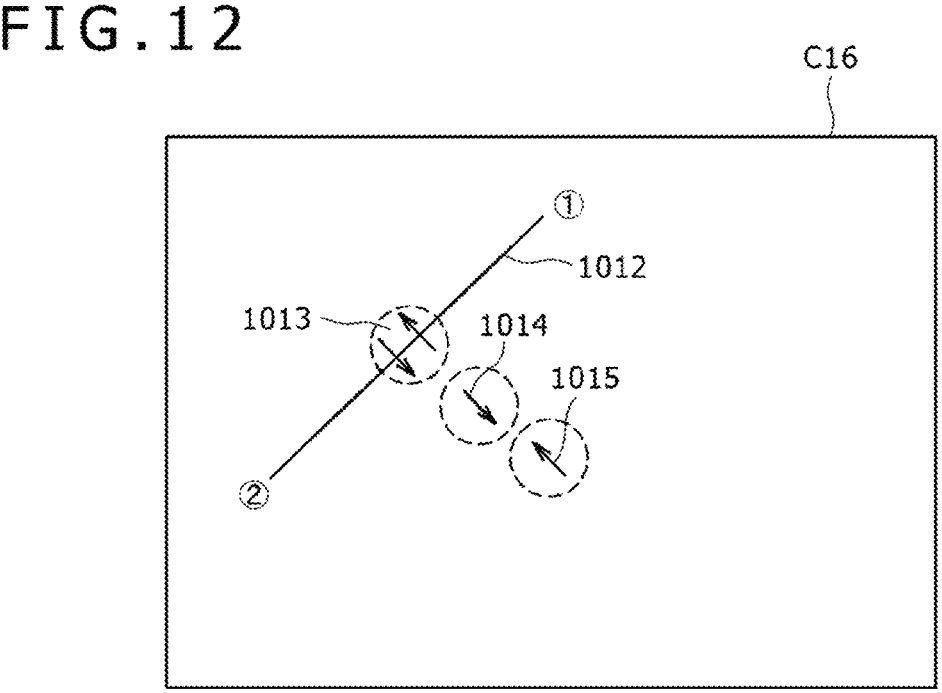
FIG. 12 is a diagram for explaining a line drawing method according to one embodiment of the present invention.

A line segment 1012 as illustrated in FIG. 12 is created by using the mouse to left-click on two points on the screen C16. An arrow 1013 is drawn at a middle point of the line segment 1012 so as to be perpendicular to the line segment 1012. A Passing filter determines in which direction an object has passed over the line segment, and determines whether or not to generate the alarm based on a direction of this arrow. The direction of the arrow can be changed by left-clicking on a point near the middle point of the line segment, for example. A default (initial) setting is "bidirectional", and each click changes the direction of the arrow in the following order: "bidirectional"→"rightward" (in relation to the screen C16 or the line segment 1012) (see an arrow 1014)→"leftward" (see an arrow 1015)→"bidirectional".

As to check of an inactive area setting using an inactive area setting check button C9-4, the settings of Filters 1 to 3 are also effective for one inactive area selected from the list, and the setting can be checked.

A live/playback image is always displayed on the screen C16, and the use is able to perform real-time setting in accordance with the image. The user is also able to check a result of the setting.

[Check of Effect of Filter Package]

A filter package operation check button C10 is used to check an operation of the filter package. The operation at this time depends on the selection status of the combination setting C1 and the enable/disable buttons C4-1 to C4-3.

[Detailed Filter Setting]

Detailed filter setting is possible. When the filter type is selected at the filter type settings C3-1 to C3-3, only options that can be set in each filter are automatically made editable at C11, C12, and C13. This setting is performed by using the mouse to draw a rectangle, a polygon, a line segment, or the like on the screen C16.

Maximum/Minimum Size Setting

Maximum and minimum size setting buttons C11-1 and C11-2 are used to set maximum and minimum sizes of the object to be subjected to filtering. Neither an object that is larger than the maximum size set therein nor an object that is smaller than the minimum size set therein is detected.

Figure 13:
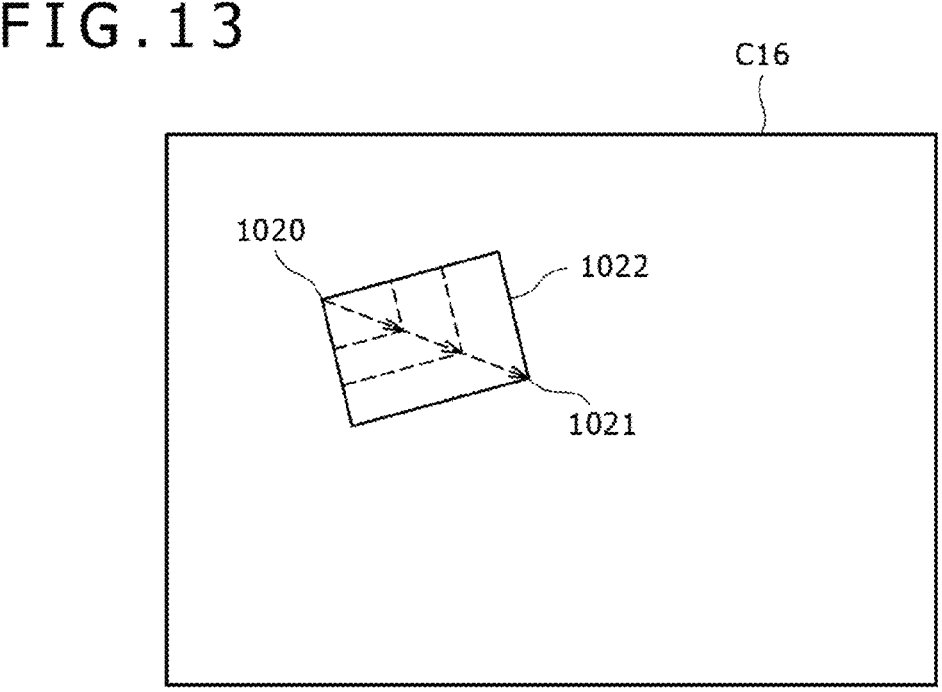
FIG. 13 is a diagram for explaining a maximum/minimum size setting according to one embodiment of the present invention.

A rectangle drawing method is used for this maximum/minimum size setting. As illustrated in FIG. 13, an area is set by using the mouse to drag an arbitrary point 1020 on the screen C16 to specify a width and a length of a rectangle 1022. Creation of the rectangle 1022 with the point 1020 for its origin is started by left-clicking on the point 1020 and starting drag of the point 1020 keeping a left button of the mouse held down. The rectangle 1022 is determined by, after the drag, releasing the left button of the mouse at an arbitrary point 1021. After the rectangle 1022 is determined, it is possible to change the size of the rectangle by placing a mouse cursor at one of an upper side, a base, a left side, a right side, and four vertices of the rectangle, and starting a drag keeping the left button of the mouse held down. Further, it is possible to move the rectangle by placing the mouse cursor at a point inside the rectangle and dragging the point keeping the left button of the mouse held down. When either the maximum size setting button C11-1 or the minimum size setting button C11-2 is clicked on, an editing mode starts. Since the selected button C11-1 or C11-2 enters a depressed state, whether the current editing mode is for maximum size setting or minimum size setting is apparent to the user. In order that the set maximum (minimum) size may not be smaller (larger) than the set minimum (maximum) size, when too small (large) a rectangle is drawn, the set minimum (maximum) size is automatically made smaller (larger). The position of the drawn figure is irrelevant to the setting, and the length and width of the rectangle are effective.

Maximum/Minimum Speed Setting

Maximum and minimum speed setting buttons C12-1 and C13-1 are used to set maximum and minimum speeds of the object to be subjected to filtering. Neither an object that moves on the screen C16 at higher than the maximum speed nor an object that moves on the screen C16 at lower than the minimum speed is detected.

Figure 14:
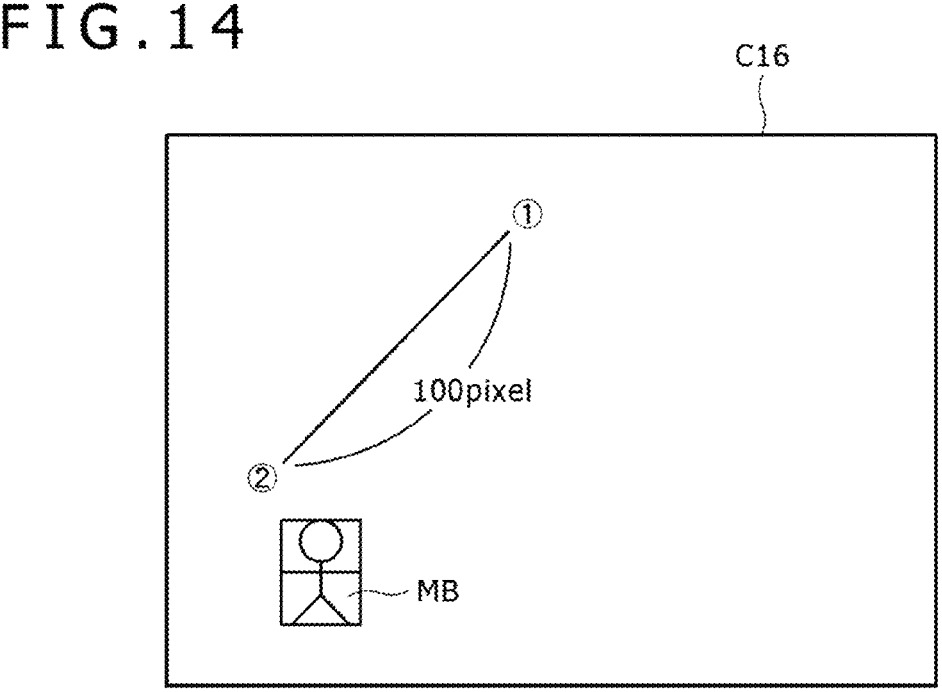
FIG. 14 is a diagram for explaining a maximum/minimum speed setting according to one embodiment of the present invention.

A line segment drawing method is used for this maximum/minimum speed setting. As illustrated in FIG. 14, two points on the screen C16 are clicked on with the mouse to determine a length of a line segment. The length (e.g., 100 pixels) is automatically measured, and a result of this measurement is reflected in a pixel display box C12-2 or C13-2. The pixel display boxes C12-2 and C13-2 are used for display only, and the user is unable to change a value set therein. The user specifies a speed of an object MB by inputting a numerical value in a second setting box C12-3 or C13-3. The speed of the object MB is specified by specifying the number of seconds in which the object MB travels a distance of the line segment drawn on the screen C16. In the case where "three seconds" has been specified when setting the maximum speed for a certain line segment, an object that spends three or less seconds traveling a distance corresponding to the line segment in the screen C16 is not detected. Conversely, in the case where "three seconds" has been specified when setting the minimum speed therefor, an object that spends three or more seconds traveling the same distance is not detected. The types of the filters for which the maximum/minimum speed setting is possible are only Appearance, Disappearance, and Passing filters. Neither the position nor orientation of the drawn figure is irrelevant to the setting, while the length of the line segment is effective.

Inactive Area Setting

The polygon drawing method is used for the inactive area setting. The inner area of the polygon is set as the inactive area. The inactive areas are selected from the inactive area list C5 one by one.

Option Setting

Figure 15:
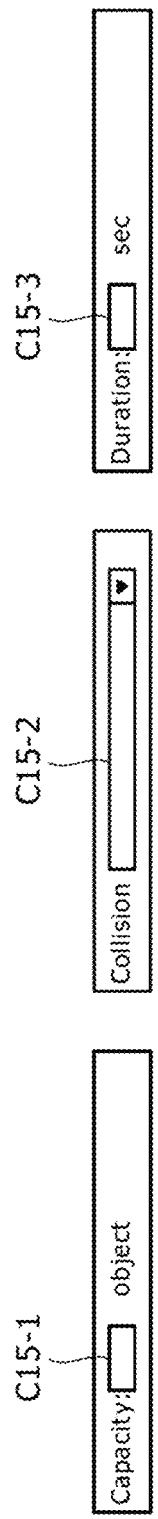
FIGS. 15A, 15B, and 15C are diagrams for explaining setting screens (filter setting options) according to one embodiment of the present invention.

In an option setting area C15, an option that can be set is displayed. The option that can be set varies depending on the filter type. FIGS. 15A to 15C show exemplary option setting screens.

The Number of Objects (Capacity)

A number-of-objects setting box C15-1 is used to set a minimum number of objects that, when detected, cause the generation of the alarm in a Capacity filter.

Collision Determination (Collision)

Figure 16:
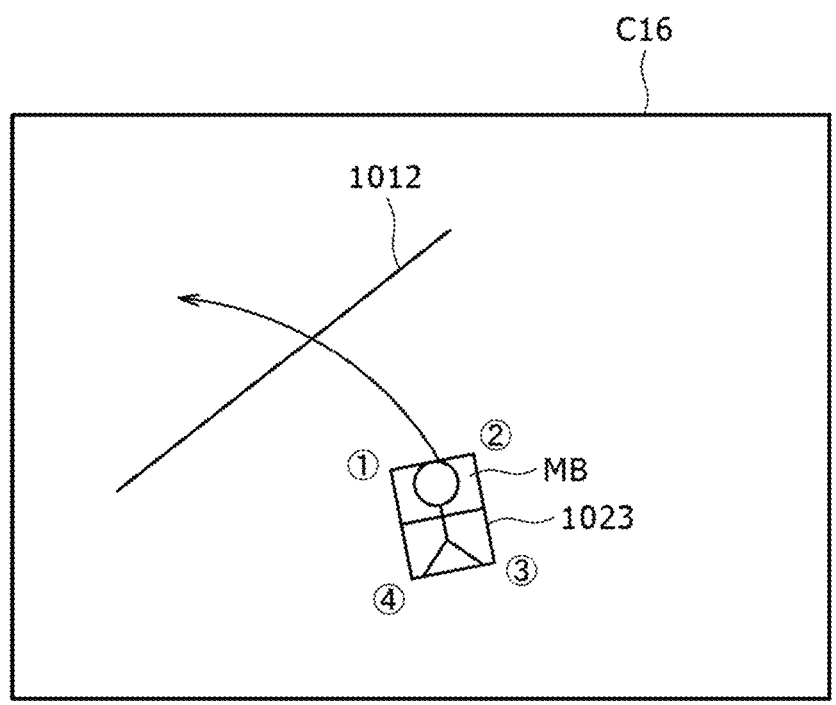
FIG. 16 is a diagram for explaining collision determination according to one embodiment of the present invention.

A collision determination setting box C15-2 is used to specify a collision determination corner of a moving object frame 1023 of the object MB. The Passing filter generates the alarm when the collision determination corner has entirely passed over the line (see FIG. 16).

Duration

A duration setting box C15-3 is used to specify a loitering limit time (measured in seconds). A Loitering filter generates the alarm when an object has been loitering longer than the loitering limit time. The duration setting box C15-3 is also used to specify an unattendance (or removal) limit time. An Unattended (or Removed) filter regards an object as being an immovable object (or having been removed) when the object remains unmoved (or continues to be not present) longer than the unattendance (or removal) limit time.

Setting Cancellation

A cancel button C14 is used to delete a drawn figure being edited on the screen C16.

[Live/Playback Switching]

Figure 17B:
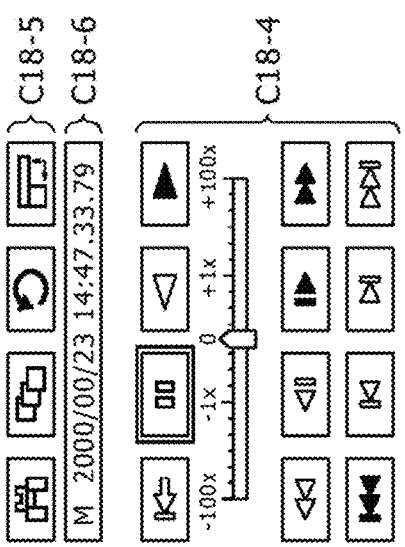
FIGS. 17A and 17B are diagrams for explaining setting screens (Live/Playback mode switching) according to one embodiment of the present invention.
Figure 17A:
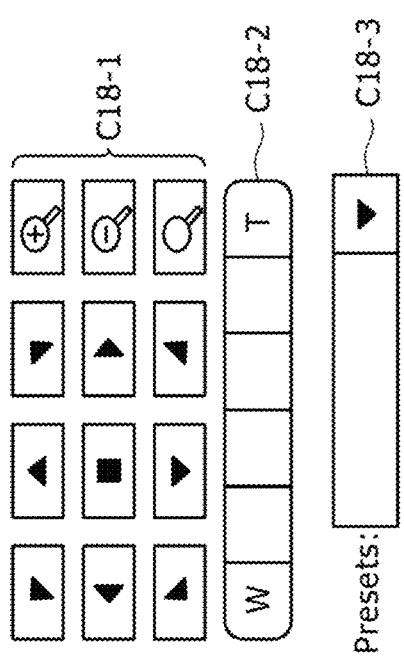

A live mode button C17-1 and a playback mode button C17-2 are used to switch a mode of a camera image displayed on the screen C16 between a Live mode and a Playback mode. As a result of this mode switching, a soft controller displayed on an area C18 is switched. FIGS. 17A and 17B illustrate examples of the soft controller.

Live Mode

When the Live mode is being selected, a pan/tilt button C18-1, a zoom button C18-2, and a preset button C18-3 are displayed as illustrated in FIG. 17A. The preset button C18-3 is used to register beforehand an initial position of the metadata generation camera, and the user is able to allow the metadata generation camera to return into the registered initial position in a moment by a home position operation. Besides, a scaling button and the like may be displayed.

Playback Mode

When the Playback mode is being selected, various playback-related buttons C18-4, a search button C18-5, and a photographing time C18-6 are displayed as illustrated in FIG. 17B. Search is performed based on a date and time, for example. Besides, a timeline or the like for indicating a length of a time that has elapsed since a playback time serving as a reference may be displayed.

According to the above-described embodiment of the present invention, it is possible to perform the setting of the filters and the setting of the filter combination (sequential or parallel) simultaneously with a single screen. At the time of the filter setting, a predetermined number (e.g., three) of filter setting sections are initially arranged in order. Therefore, when performing sequential filter setting, the user is able to set the filters with packaging in view. In addition, since the user is able to check an operation set for each filter using the filter setting edition buttons C9-1 to C9-3, the user can sequentially check whether an effective setting has been made for each filter when performing the sequential filter setting. Further, it is possible to change the order of the filters by clicking on the filter switch button C6-1 or C6-2 once. Still further, by using the enable/disable button C4-1, C4-2, or C4-3, it is possible to disable a function of any filter already set while keeping the setting of the filter preserved. Still further, the switching of the filter combination is also possible with a single click, and it is easy to recognize the current setting by seeing the combination setting C1.

Moreover, it is possible to specify the detailed settings of the filters not with the numerical value but by drawing a figure on the screen C16 while actually seeing an image of an object of monitoring and referring to object information (e.g., the size, the moving speed, etc.) on the GUI (i.e., the screen C16). It is difficult for the user to specify an actual size or speed of an object by a setting method using only the numerical value, and to set the filters properly. However, by performing the filter setting using the figure drawing while seeing an arbitrary live or playback image, the user is able to visually specify the same size and speed as those of the object to be subjected to filtering and an arbitrary area, and to easily set a filter that will cause few erroneous detections.

Further, as one filter setting method, it is possible to select an object within the image (on the screen C16) for the filter setting. In the case where the maximum/minimum size is set, for example, clicking on an object at an arbitrary moment within the image produces the same effect as that achieved by drawing an object of the same size. In the case where the moving speed is set, the user can click on an object moving within the image twice, each at a different moment, to obtain the moving speed within the image based on positions of the first and second clicks and a difference in time between the two clicks. Still further, it is possible to copy filter setting information between different cameras. Thus, when similar settings are made for two cameras, it is possible to make fine adjustments to a setting made for one camera to easily create a proper setting for the other camera.

Note that, in the detailed filter setting, the position and size of the figure in the filter detection area may be dynamically changed in accordance with the panning/tilting operation or zoom-in/zoom-out operation of the metadata generation camera.

Note that the series of processes in the above-described embodiment may be implemented either by hardware or by software. In the case where the series of processes are implemented by software, a program that forms desired software is installed into a dedicated computer or, for example, a general-purpose personal computer that, when various programs are installed therein, becomes capable of performing various functions.

Needless to say, the functions of the above-described embodiment can also be achieved by supplying a storage medium having stored therein a program code of the software that implements the functions of the above-described embodiment to a system or apparatus to allow a computer (or a control device such as a CPU) of the system or apparatus to read the program code stored in the storage medium and execute the read program code.

In this case, as the storage medium for supplying the program code, a floppy disk, a hard disk, an optical disk, a magneto-optical disk, a CD-ROM, a CD-R, a magnetic tape, a non-volatile memory card, a ROM, or the like may be used.

Not only the functions of the above-described embodiment may be achieved by the computer that executes the read program code, but also an OS or the like that is running on the computer may perform a part or the whole of actual processing based on an instruction of the program code to achieve, by this processing, the functions of the above-described embodiment.

Note that the steps implemented by the program forming the software and described in the present specification may naturally be performed chronologically in order of description but need not be performed chronologically. Some steps may be performed in parallel or independently of one another.

It should be understood by those skilled in the art that various modifications, combinations, sub-combinations and alterations may occur depending on design requirements and other factors insofar as they are within the scope of the appended claims or the equivalents thereof.

What is claimed is:

1. An image processing apparatus, comprising:
    an image data acquisition section configure to acquire image data;
    a metadata acquisition section configured to acquire metadata representing information concerning an object of surveillance;
    a display control section configured to control a display section to display a setting screen usable for setting a plurality of filters;
    a filter setting section configured to perform filter setting using the information of the metadata; and
    a combination setting section configured to set a combination of the plurality of filters,
    wherein
        said filter setting section and said combination setting section are provided on the same setting screen,
        the filter setting section sets at least a first filter and a second filter,
        the first filter is set to perform at least one first function of capacity function, loitering object detection function, unattended object detection function or removed object detection function,
        the second filter is set to perform at least one second function of capacity function, loitering object detection function, unattended object detection function or removed object detection function,
        the display control section is configured to control the display section to display an acquired image,
        the filter setting section performs the filter setting by drawing an area on the image, and
        the at least one first function performed by the first filter and the at least one second function performed by the second filter are performed on the area.

2. The image processing apparatus according to claim 1, wherein said combination setting section is a switching section configured to switch a type of the combination of the plurality of filters, the switching section being provided in the setting screen.

3. The image processing apparatus according to claim 2, wherein options of a type of the combination of the plurality of filters include:
    a parallel mode configured to output an alarm each time a condition of any of the plurality of filters is satisfied by the metadata ; and
    a sequential mode configured to output one alarm when the conditions of the plurality of filters are satisfied by the metadata in a set order.

4. The image processing apparatus according to claim 1, wherein said filter setting section is an enable/disable setting section configured to specify whether or not each of the plurality of filters is used, the enable/disable setting section being provided in the setting screen.

5. The image processing apparatus according to claim 1, wherein said filter setting section performs the filter setting by drawing a figure on a screen provided at a part of the setting screen and showing the image data.

6. A filter setting method, comprising the steps of:
   acquiring image data;
   acquiring metadata representing information concerning an object of surveillance;
   controlling display of a setting screen usable for setting a plurality of filters;
   performing, by a filter setting section, filter setting by using the information of the metadata;
   setting, by a combination setting section, a combination of the plurality of filters,
   wherein
      said filter setting section and said combination setting section are provided on the same setting screen,
      the filter setting section sets at least a first filter and a second filter,
      the first filter is set to perform at least one first function of capacity function, loitering object detection function, unattended object detection function or removed object detection function, and
      the second filter is set to perform at least one second function of capacity function, loitering object detection function, unattended object detection function or removed object detection function; and
   controlling display of an acquired image,
      wherein
         the filter setting section performs the filter setting by drawing an area on the image, and
         the at least one first function performed by the first filter and the at least one second function performed by the second filter are performed on the area.

7. An image processing system, comprising:
   a camera configured to generate image data of an image and metadata representing information concerning an object of surveillance;
   a display device; and
   an imaging processing apparatus including:
      an image data acquisition section configure to acquire the image data from the camera;
      a metadata acquisition section configured to acquire the metadata from the camera;
      a display control section configured to control a display section to display a setting screen on the display device usable for setting a plurality of filters;
      a filter setting section configured to perform filter setting using the information of the metadata; and
      a combination setting section configure to set a combination of the plurality of filters,
      wherein
         said filter setting section and said combination setting section are provided on the same setting screen,
         the filter setting section sets at least a first filter and a second filter,
         the first filter is set to perform at least one first function of capacity function, loitering object detection function, unattended object detection function or removed object detection function,
         the second filter is set to perform at least one second function of capacity function, loitering object detection function, unattended object detection function or removed object detection function,
         the display control section is configured to control the display section to display an acquired image,
         the filter setting section performs the filter setting by drawing an area on the image, and
         the at least one first function performed by the first filter and the at least one second function performed by the second filter are performed on the area.

* * * * *